(12) United States Patent
Grochocki, Jr. et al.

(10) Patent No.: US 11,060,878 B2
(45) Date of Patent: Jul. 13, 2021

(54) GENERATING PERSONALIZED ROUTES WITH USER ROUTE PREFERENCES

(71) Applicant: Microsoft Technology Licensing, LLC, Redmond, WA (US)

(72) Inventors: David Grochocki, Jr., Seattle, WA (US); Elizabeth Salowitz, Seattle, WA (US); Ana Lilia Otero Diaz, Woodinville, WA (US); Kshitij Sethi, Bellevue, WA (US); Kshitij Mehta, Bothell, WA (US); Jeff West, Sammamish, WA (US); Mansi Rajkondawar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/821,874

(22) Filed: Mar. 17, 2020

(65) Prior Publication Data

US 2020/0217682 A1 Jul. 9, 2020

Related U.S. Application Data

(63) Continuation of application No. 15/820,174, filed on Nov. 21, 2017, now Pat. No. 10,663,311, which is a continuation-in-part of application No. 15/243,631, filed on Aug. 22, 2016, now Pat. No. 10,274,328.

(51) Int. Cl.
*G01C 21/34* (2006.01)
*G01C 21/36* (2006.01)

(52) U.S. Cl.
CPC ..... *G01C 21/3484* (2013.01); *G01C 21/3415* (2013.01); *G01C 21/3492* (2013.01); *G01C 21/3676* (2013.01); *G01C 21/3423* (2013.01)

(58) Field of Classification Search
CPC ............ G01C 21/3484; G01C 21/3492; G01C 21/3415; G01C 21/3676; G01C 21/3423
See application file for complete search history.

(56) References Cited

U.S. PATENT DOCUMENTS

| 2010/0211304 | A1* | 8/2010 | Hwang | G01C 21/3484 |
| | | | | 701/532 |
| 2013/0262222 | A1* | 10/2013 | Gibson | G06Q 10/047 |
| | | | | 705/14.49 |
| 2017/0314944 | A1* | 11/2017 | Konig | G01C 21/3415 |

\* cited by examiner

*Primary Examiner* — Anne Marie Antonucci
(74) *Attorney, Agent, or Firm* — Alleman Hall Creasman & Tuttle LLP

(57) ABSTRACT

A navigation device is provided that includes one or more input devices configured to receive starting and ending locations for route navigation, and a processor configured to retrieve user route preferences. The user route preferences may indicate one or more preferred route characteristics. The processor further may be configured to receive a request for a route from a starting location to an ending location via the one or more input devices, to read stored map information including a plurality of route segments. Each route segment may include route segment data indicating one or more route characteristics of that route segment. The processor may further be configured to generate a personalized route that includes at least one route segment having route segment data indicating at least one of the one or more preferred route characteristics of the user, and to display the personalized route to the user.

17 Claims, 14 Drawing Sheets

GENERATING PERSONALIZED ROUTES WITH USER ROUTE PREFERENCES

CROSS REFERENCE TO RELATED APPLICATIONS

This application is a continuation of U.S. patent application Ser. No. 15/820,174, filed Nov. 21, 2017, which is a continuation-in-part of U.S. patent application Ser. No. 15/243,631, filed Aug. 22, 2016, the entire contents of each of which are hereby incorporated herein by reference for all purposes.

BACKGROUND

Routing services have been developed that can respond to user queries for routes from a starting location to an ending location with a suggested route, using map data, a user specified travel mode (e.g., walking, driving, biking, or riding public transportation), and current traffic information crowdsourced from signals received from users' mobile electronic devices traveling within the map area. These routing services may use algorithms to estimate travel time along various possible routes based on current traffic conditions, and may display suggested routes, ranked by total travel time.

SUMMARY

A navigation device is provided that includes one or more input devices configured to receive starting and ending locations for route navigation, and a processor configured to retrieve user route preferences for a user of the navigation device. The user route preferences may indicate one or more preferred route characteristics. The processor further may be configured to receive a request for a route from a starting location to an ending location via the one or more input devices, to read stored map information including a plurality of route segments. Each route segment may include route segment data indicating one or more route characteristics of that route segment. The processor may further be configured to generate a personalized route that includes at least one route segment having route segment data indicating at least one of the one or more preferred route characteristics of the user, and to display the personalized route to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

The inventors of the subject application have discovered a drawback with the navigation systems described in the Background above, namely, that not all users may perceive a route that is ranked highly by the navigation system to be preferable to alternative routes. Indeed, depending on their driving skills, preferences, and temperaments, users may perceive routes differently, and a route that is preferable to a first driver may be less preferable to a second driver. For example, some drivers may prefer scenic routes, others may prefer routes in which they can drive more aggressively around curves or at higher speeds, others may prefer routes that are slower, and still other drivers may prefer to avoid traffic congestion even if a congested route is fastest. Further, these minor variations in preferences are not recognizable by current routing systems, and thus such systems may systematically output routes that are less than optimal to certain users, which may result in user dissatisfaction over time. The present disclosure attempts to address this drawback and avoid such user dissatisfaction by providing personalized routes.

Figure 1:
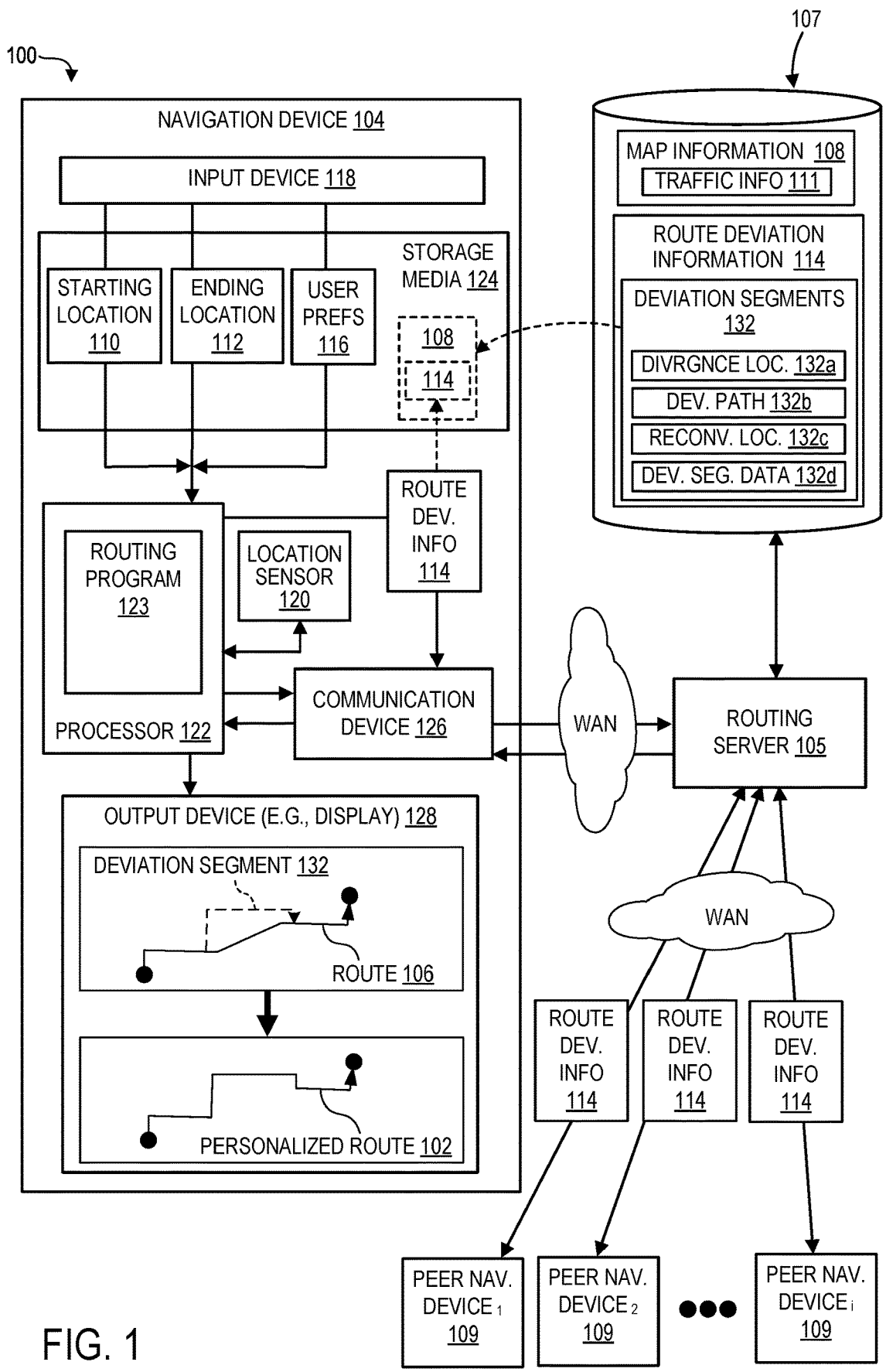
FIG. 1 shows a block diagram of an example computing system to generate personalized routes using route deviation information.

FIG. 1 shows an example computing system 100 for generating one or more personalized routes 102. In the computing system 100, a navigation device 104 may comprise one or more input devices 118, one or more location sensors 120, a processor 122 configured to execute a routing program 123, one or more storage media 124, one or more communication devices 126, and one or more output devices 128. It will be appreciated that the routing program 123 includes program logic to perform the various functions performed by the processor 122 of the navigation device 104. The communication device 126 of the navigation device is configured to be in communication with a routing server 105 via, for example, a wide area network (WAN). The routing server 105 may in turn be in communication with at least a server-accessible database 107 and one or more peer navigation devices 109. Server-accessible database 107 includes map information 108, traffic information 111, as well as route deviation information 114 indicating where users have actually deviated from recommended routes during navigation.

Although the navigation device 104 is illustrated as being in communication with the routing server 105, which is in turn in communication with the server-accessible database 107, to access map information 108, traffic information 111, and route deviation information 114, it will be appreciated that in some examples, the navigation device 104 may store a local copy of the map information 108 and route deviation information 114. In these examples, the navigation device 104 may perform the methods and processes described herein based on the locally stored map information 108 and route deviation information 114. In other examples, a hybrid architecture may be adopted in which a first portion map information 108 is stored on the navigation device 104 and a second portion of map information 108 is stored on the server accessible database 107, and the navigation device can be programmed to retrieve map information 108 from the appropriate location.

The navigation device 104 is configured to generate the one or more personalized routes 102 by (1) monitoring deviations of the navigation device 104 from a standard route, (2) generating route deviation information 114 comprising one or more deviation segments 132 based on each deviations from the standard route, and (3) substituting the deviation segments 132 into future standard routes to create personalized routes 102.

A standard route may be either a route 106 generated by the navigation device 104 in response to a request by a user of the navigation device 104, or the standard route may be a route 106 that is automatically generated in response to a determination that a travel path 130 of the navigation device 104 is a frequent route between a frequent origin/destination pair. The standard route may be from a between a start and destination location, and in some cases may travel through intermediate waypoints, i.e., the standard route may be a multiple destination route. The standard route may be generated in part based on user preferences that are explicitly input prior to route generation by the user, such as preferences to avoid highways or avoid toll roads. Standard route generation will be discussed in more detail later.

Figure 2:
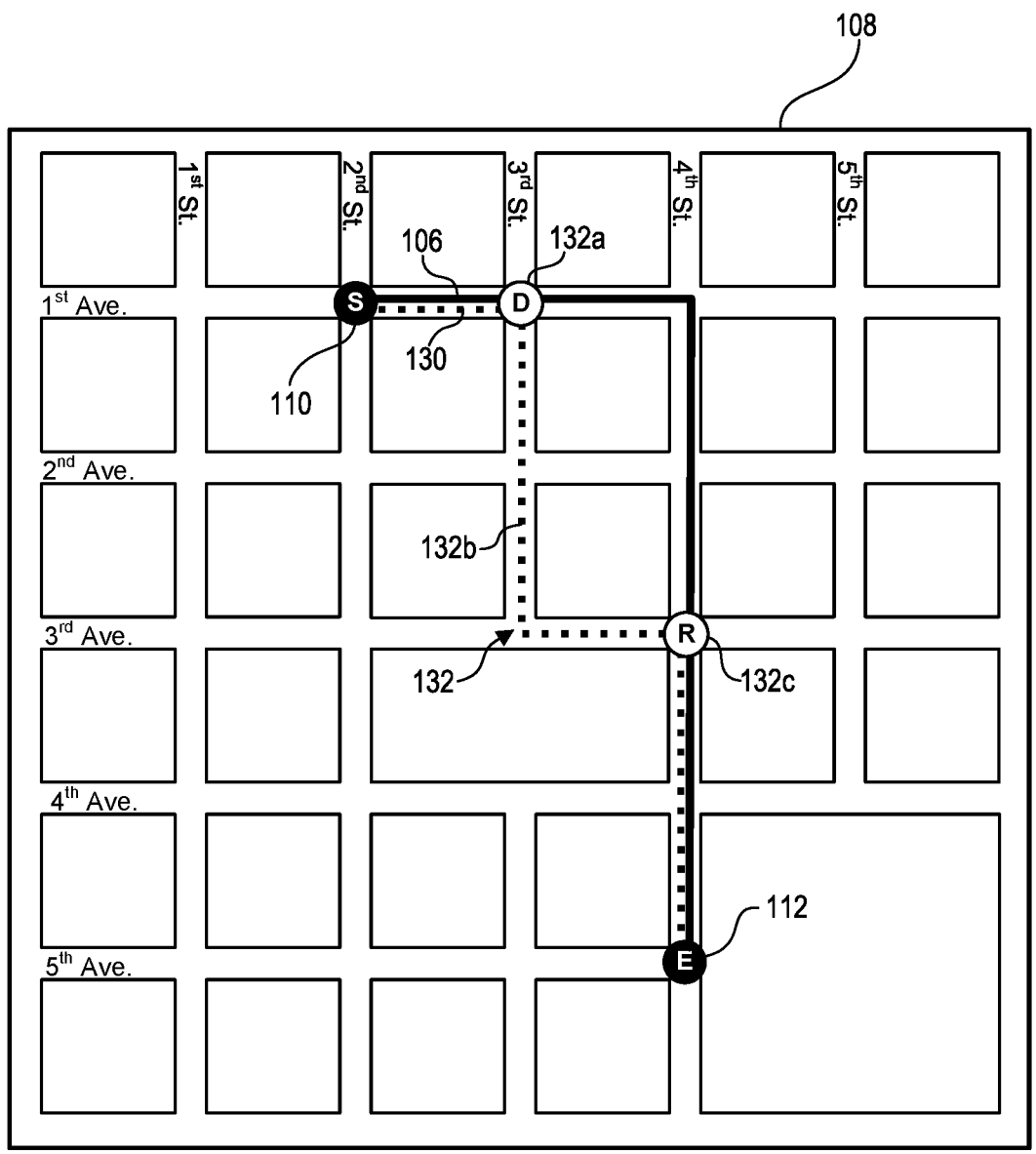
FIG. 2 illustrates an example route and travel path according to one embodiment of the present disclosure.

Turning now to FIG. 2, an example route 106 is shown extending from a starting location 110 to an ending location 112, and the route 106 is displayed overlaid with the map information 108. After generating the route 106, the navigation device 104 determines at least a travel path 130 of the one or more location sensors 120, and the processor 122 is further configured to determine if the travel path 130 deviates from the route 106. In this example, the travel path 130 was determined to deviate from the route 106 along a deviation segment 132. Upon determining that the travel path 130 deviates from the route 106, the processor 122 of the navigation device 104 is further configured to generate route deviation information 114 for one or more deviation segments 132. As graphically represented in FIG. 2 and schematically represented in FIG. 1, each deviation segment 132 includes at least a divergence location 132*a* indicating a point where the travel path 130 separates from the route 106, a deviation path 132*b*, a reconvergence location 132*c* indicating a point where the travel path 130 rejoins the route 106, and deviation segment data 132*d*, the latter of which is shown only schematically in FIG. 1. Furthermore, the deviation path 132*b* extends between the divergence location 132*a* and a reconvergence location 132*c*. This allows the navigation device 104 to build a collection of personalized deviation segments (e.g. shortcuts) by identifying common variations from standard routes and familiar journeys a user of the navigation device takes.

Deviation segment data 132*d* may include information about the deviation segment 132 and the context in which the deviation segment 132 is used. For example, the deviation segment data 132*d* may include one or more of a time of day, a day of the week, a traffic condition, a direction of travel, a type of road, a weather condition, length of the deviation path, a frequency of travel, a topographic change, a transportation mode, a relative distance along the route, or any other aspect of the deviation segment 132 or contextual aspect about the deviation segment 132 while it is traveled by a user. This information may be used by the navigation device 104 to identify patterns with which specific deviation segments 132 are used. For example, one deviation segment 132 may be a shortcut used to avoid traffic on a weekday at rush hour, consequently that deviation segment may not be applicable on Sunday afternoons. Alternatively, a deviation segment 132 may be used for safety instead of efficiency, such as a user preferring a specific deviation segment 132 having little topographic variation on snowy days, which may indicate that the user is avoiding a potentially slippery hill. In another example, a deviation may depend on the mode of transportation, such as a user preferring a certain deviation segment 132 while on a bicycle, but not via another mode of transportation. Similarly, a user may only use a specific deviation segment 132 when walking between modes of public transportation, or in a similar situation between any combinations of transportation modes. Other information about the route 106 itself may also explain when a user may only utilize specific deviation segments 132, such as if the deviation segment 132 occurs at the beginning or the end of the route 106. Likewise, a deviation segment may not be bi-directional and might only be applicable for certain directions of travel. For example, a user may only use a specific deviation segment 132 when they are traveling north, but not while traveling south on the same route. Any of the deviation segment data 132*d* described herein may be used by personalized routing algorithms to determine whether or not a deviation segment 132 should be included in a personalized route 102.

It will be obvious that the above examples are illustrative and not meant to be an exhaustive list. Other categories of deviation segment data 132*d* may be determined by the navigation device 104 to determine the context of a deviation segment 132, and therefore better predict the usefulness of that deviation segment 132 when generating personalized routes 102. Additionally, a single deviation segment may be used in multiple contexts. For example, a deviation segment 132 may be both a shortcut to avoid traffic and also as a detour to avoid a slippery hill. Accordingly, the navigation device 104 may be configured to utilize a given deviation segment 132 in multiple, different contexts based on subsets of deviation segment data 132*d*.

Returning to FIG. 1, the route deviation information 114 may either be stored on the storage media 124 of the navigation device 104 or transmitted by the one or more communication devices 126 to a server. In any of the examples described herein, the stored route deviation information 114 may either be route deviation information 114 generated by the navigation device 104 at a time prior to generating the route 106, or route deviation information 114 generated by one or more peer navigation devices 109 at a time prior to generating the route 106.

Once route deviation information 114 has been generated, subsequent requests to generate a route from a starting location 110 to an ending location 112 may cause the navigation device to generate both a route 106 and a personalized route 102. Furthermore, the navigation device 104 may receive user preferences 116 via one or more input devices 118 to further refine the generation of the personalized route 102.

The navigation device 104 is configured to generate a route 106 based at least on map information 108, a starting location 110 and an ending location 112. To generate a requested route, the one or more input devices 118 of the navigation device 104 may be configured to receive the starting location 110 and the ending location 112. The start location 110 may either be input by a user of the navigation device 104 via the one or more input devices 118, or take a default value. For example, the starting location 110 may be a current location detected by the one or more location sensors 120 of the navigation device 104 (e.g., GPS, indoor positioning technology, or the like). Similarly, the ending location 112 may also be input by a user via the one or more input devices 118 or take a default value. Examples of default values of the ending location 112 include current search results, a favorite destination, a home destination, a frequent destination at a given time of day, such as going home after work, or the like.

Upon receiving a starting location 110 and an ending location 112, the processor 122 of the navigation device 104 generates the route 106 with route data 106a based at least on the map information 108, the starting location 110 and the ending location 112. The processor 122 of the navigation device 104 is configured to read stored map information 108 and route deviation information 114. In any of the examples herein, the inputs, outputs, user preferences 116, map information 108, route deviation information 114 and applications can be stored in one or more computer-readable storage media 124 or computer-readable storage devices. However, the storage media 124 may either be a component of the navigation device 104 or on a server in communication with the navigation device 104 through one or more communication devices 126. The processor 122 is then configured to generate a route 106 based at least on the map information 108, the starting location 110 and the ending location 112. The route 106 can be generated based on information as described herein, and known route generation algorithms may be used to preferentially generate a route 106 based on, for example, estimated time of arrival, traffic, use of thoroughfares, and other general information used to provide routes to all users. After route generation, the route 106 may be presented to the user via one or more output devices 128 of the navigation device 104 configured to output the route 106 and one or more personalized routes 102. In practice, the route 106 can be specified in human-readable form as instructions to a user wishing to navigate from the starting location 110 to the ending location 112.

Figure 3A:
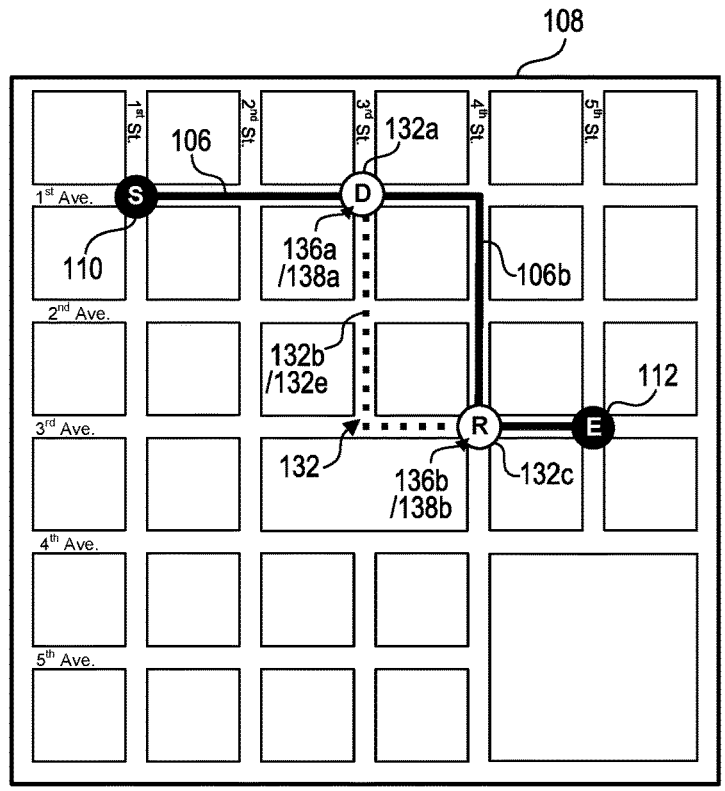
FIGS. 3A-3B illustrate one example scenario to generate a personalized route according to one embodiment of the present disclosure.
Figure 3B:
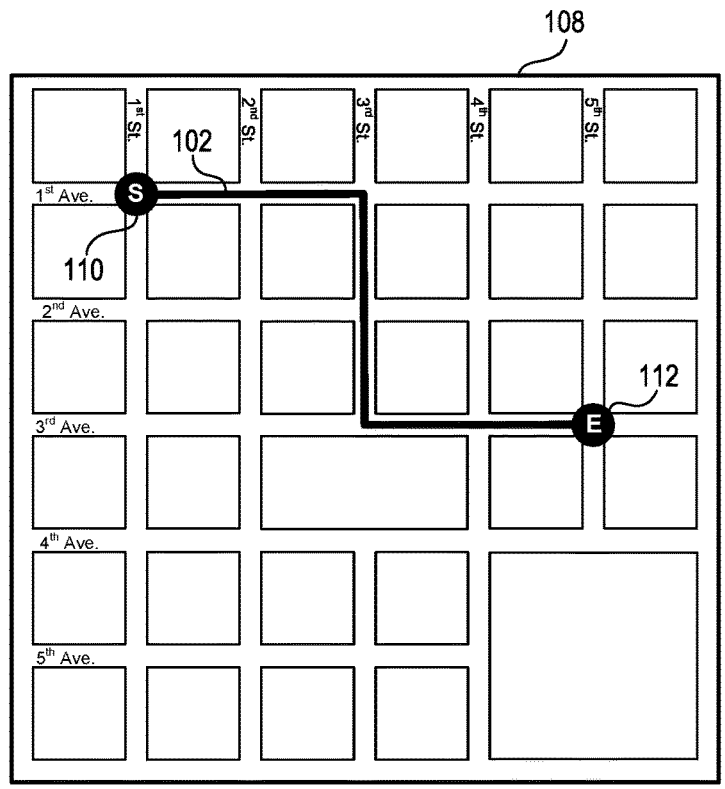

FIGS. 3A and 3B illustrate the use of route deviation information 114 to generate a personalized route 102. The processor 122 is then configured to determine if each of one or more deviation segments 132 of the route deviation information 114 intersects the route 106 at a plurality of intersection points, and if a predetermined subset of the deviation segment data 132d matches a corresponding subset of the route data 106a. In the example shown in FIG. 3A, the deviation segment 132 was found to intersect with the route 106. Upon determination that each of the one or more deviation segments 132 intersects the route 106 at a plurality of intersection points 136, and that a predetermined subset of the deviation segment data 132d matches a corresponding subset of the route data 106a, the processor 122 is further configured to generate one or more personalized routes 102. By replacing a route portion 106b between a first intersection point 138a and a last intersection point 138b of the plurality of intersection points 136 with a corresponding deviation portion 132e of the deviation path 132b for each intersecting deviation segment 132, the personalized route 102 shown in FIG. 3B may be generated.

The one or more output devices 128 may be further configured to output the one or more personalized routes 102 with an indication that the one or more personalized routes 102 are different from the route 106. The indication that the one or more personalized routes 102 are different from the route 106 may be one or more of a label, a color of the route, a sound, or any suitable indication of difference. Furthermore, the route 106 may be generated for a plurality of modes of transportation or combinations of modes of transportation, such as, for example, driving, biking, walking, or riding public transit.

The one or more input devices 118 of the navigation device 104 may be further configured to receive user preferences 116, and the user preferences 116 may comprise at least an option to select the predetermined subset of the deviation segment data 132d. This allows a user of the navigation device 104 to control which aspects of a deviation segment 132 are important when deciding to leave a recommended route. Of course, it will be obvious that the predetermined subset of the deviation segment data 132d may also be automatically selected by the navigation device 104 as a part of default user preferences 116, and a user may then be able to adjust, add or remove the predetermined subset of deviation segment data 132d to fit their needs. The predetermined subset of the deviation segment data 132d may be used by the navigation device 104 to further refine the selection of deviation segments 132 for personalized route generation, as described in more detail below. By identifying patterns in deviation segment data 132d, the navigation device 104 may be configured to present the user with a personalized route 102 that incorporates only deviation segments 132 relevant to the users current environment.

Additionally, the navigation device 104 may be further configured to add information to the deviation segment data 132d via the one or more input devices 118. For example, a user may generate deviation segment data 132d by rating a personalized route 102 based on how useful it was, selecting the personalized route 102 as a "favorite," or selecting not to use a personalized route 102. Each of these selections may increase or decrease the likelihood that the deviation segments 132 within the selected personalized route will be included when generating a personalized route 102 in the future.

Furthermore, deviation segment data 132d may incorporate information about whether or not a personalized route 102 containing a given deviation segment 132 is selected by a user of the navigation device 104 when it is output by the navigation device 104. Importantly, a user may be able to save a deviation segment 132 manually. These manually entered deviation segments 132 and deviation segment data 132d can, in turn, be used to help identify future deviation segments. Users may further view the user preferences 116 and deviation segment data 132d at any time to validate and/or remove misidentified or no-longer-relevant deviation segments 132 so the user is always in control of their data. Based at least on the deviation segment data 132d and user preferences 116, the processor 122 of the navigation device 104 may be further configured to refine the determination that a given deviation segment 132 should be substituted into a route 106.

As discussed above, although a user of the navigation device 104 may request a route 106 to be generated to an ending location 112, generating route deviation information 114 is not limited to doing so for a requested route. Instead, the route deviation information 114 may be generated in response to a determination that a travel path 130 of a frequent route of the navigation device 104 deviates from an automatically generated route. To do this, the navigation device 104 may first identify areas where the user of the navigation device 104 is the expert. For example, the navigation device 104 may be configured to detect a travel path 130 along common routes, which can be identified by any common origin/destination pairs, like home/work, home/grocery store, or other commonly repeated origin/destination pairs. Additionally, the navigation device 104 may be configured to detect a travel path 130 along a frequent route within familiar neighborhoods based on known driver information. For example, when a travel path 130 of the navigation device 104 is within X miles of home or work, an area with a cluster of favorite destinations, commonly visited or traveled parts of a city, or other frequently visited locations may be designated familiar neighborhoods.

To localize the frequent routes, the one or more location sensors 120 may be configured to continually track the location of the location sensors 120 of the navigation device 104. The processor 122 may subsequently use this information to determine frequent routes traveled by the navigation device 104, including frequently used starting locations and frequently used ending locations. A frequently used starting location and a frequent ending location of a frequent route may be received by the navigation device 104 as the starting location 110 and the ending location 112 to generate the route 106. The navigation device 104 may then generate a route 106 between the frequently used starting location and the frequently used destination location (i.e. the starting location 110 and the ending location 112), and determine if the travel path 130 of the frequent route deviates from the automatically generated route. As described above, upon determination that the travel path 130 of the frequent route deviates from the route 106, the processor 122 of the navigation device 104 may then generate route deviation information 114.

In this example, when the user of the navigation device 104 is the expert, the navigation device 104 may build a user profile of route deviation information 114 based on when the user deviates from the standard route returned by the routing algorithm. Automatic detection of route deviation patterns is useful in order to identify user navigation habits, based on common deviation paths and deviation segment data 132d, such as specific roads traveled on, roads avoided, etc. In some variations, intermediate stops along the way, such as stopping for gas, or low-frequency variations would not generate deviation segments. Likewise, if the user deviates too far from an original route, these deviation segments 132 would also not be included in the route deviation information 114.

Since most users would not explicitly search for a route 106 they are already familiar with, tracking the travel habits of a user of the navigation device 104 allows the navigation device 104 to build a detailed and thorough set of deviation segments 132 that can be later substituted in to both familiar and less familiar routes. Thus, enhancing the user experiencing by presenting a user with their preferred driving patterns, even in unfamiliar settings.

As described above for the route deviation information 114 generated by the navigation device 104, the route deviation information 114 generated by the one or more peer navigation devices 109 may also be either generated upon determination that a travel path 130 deviates from a requested route or generated in response to a determination that a travel path 130 of a frequent route of the peer navigation device 104 deviates from an automatically generated route. The use of route deviation information 114 generated by peer navigation devices 109 allows a user of a navigation device 104 to access a vast amount of knowledge about the preferred travel patterns of local users who regularly travel a route 106, friends, family, or other groups of peer navigation devices 109 that may be relevant to the user of the navigation device 104. Details about how the navigation device 104 may determine which peer navigation devices 109 to acquire route deviation information 114 from is discussed further below, with reference to user preferences 116.

Turning again to FIG. 3A, the deviation segment 132 and the route 106 were determined to intersect at two intersection points 136a and 136b, and the deviation segment data 132d and the route data 106a each indicate a same time of day (not shown).

Notably, the starting location 110 and the ending location 112 of the route 106 in FIG. 3A is different from the starting location 110 and the ending location 112 of the route 106 in FIG. 2. By substituting deviation segments 132 generated based on one route into a different, intersecting route, the route deviation information 114 may be utilized in a variety of contexts to generate a wide variety of personalized routes 102. However, it should be obvious that one or both of the starting location 110 and the ending location 112 of the route 106 in FIG. 3A could be the same as those of the route 106 in FIG. 2.

Figure 4A:
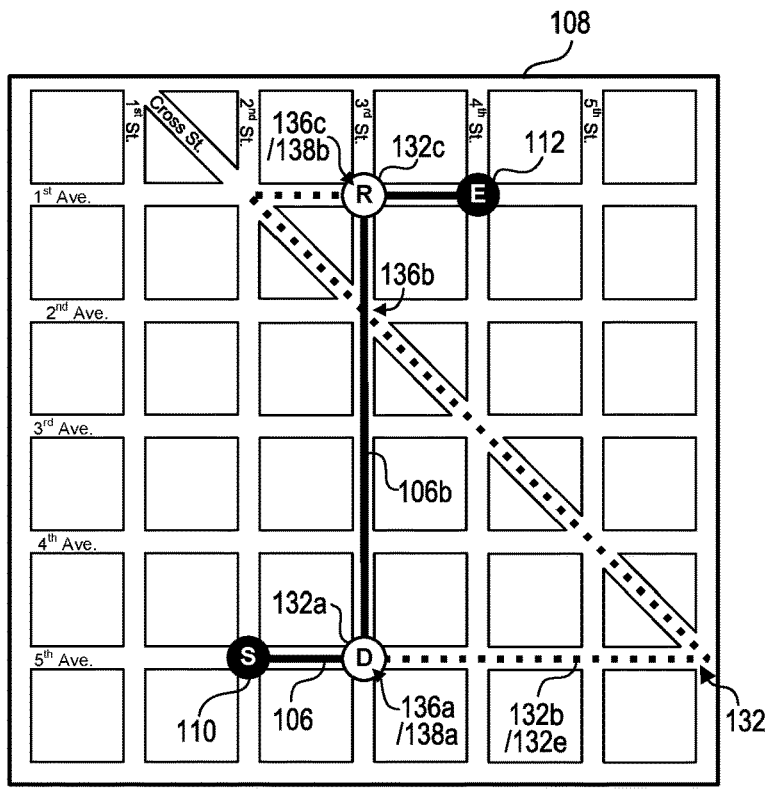
FIGS. 4A-4B illustrate another example scenario to generate a personalized route according to one embodiment of the present disclosure.
Figure 4B:
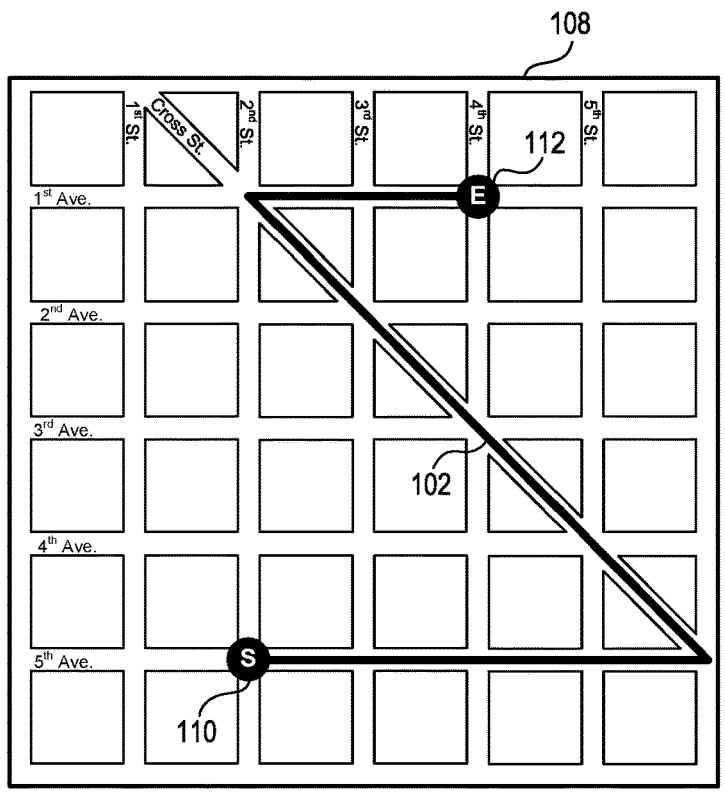

As shown in FIG. 4A, a deviation segment 132 may intersect a route 106 with more than two intersection points 136. In this example, the deviation path 132b intersects the route 106 at three intersection points 136a, 136b, and 136c. As with the previous examples, a route portion 106b between a first intersection point 138a and a last intersection point 138b of the plurality of intersection points 136 is replaced with a corresponding deviation portion 132e of the deviation path 132b to create the personalized route 102 shown in FIG. 4B. In this example, the deviation portion 132e and the deviation path 132b are the same, the first intersection point 138a occurs at the divergence location 132a, and the last intersection point 138b occurs at the reconvergence location 138b. However, as described below, each of those pairs of information could be different from one another. Furthermore, although the first and last intersection points 138a and 138b used to define the deviation segment 132 represent the first time and last time a deviation path 132b encounters the route 106 in this example, the first and last intersection points 138a and 138b may instead be any pair of intersection points for a single deviation path. For example, in this scenario the navigation device 104 may create two deviation segments 132 from the deviation path 132b shown in FIG. 4A instead of one.

Figure 5A:
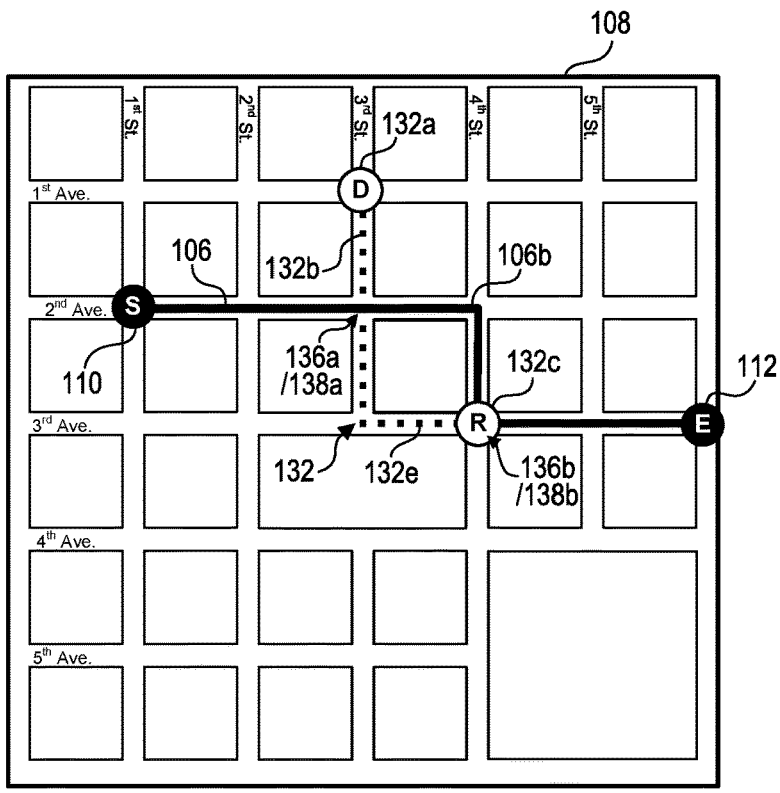
FIGS. 5A-5B illustrate another example scenario to generate a personalized route according to one embodiment of the present disclosure.
Figure 5B:
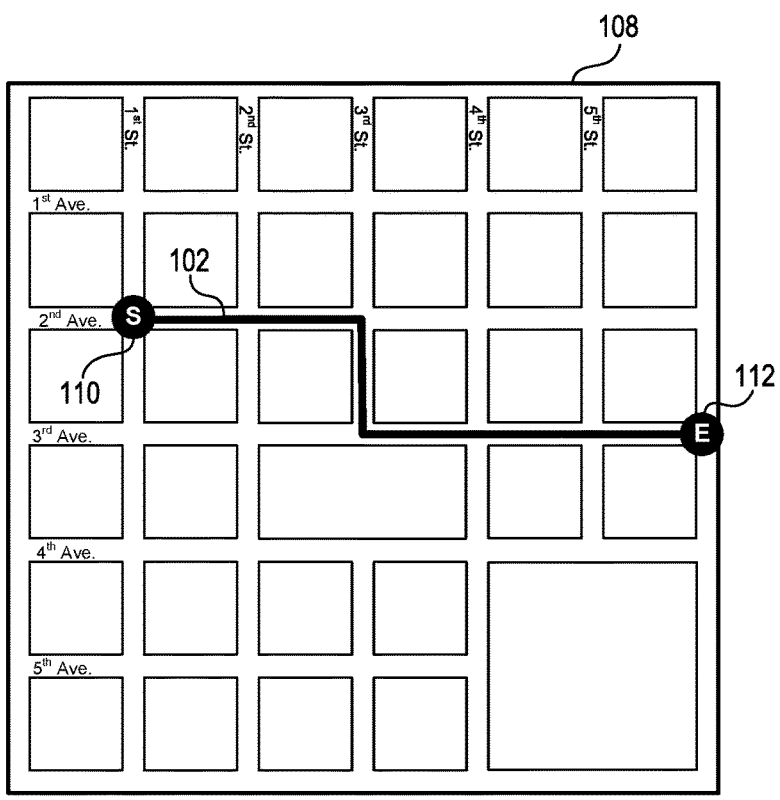

In the examples shown in FIGS. 3A-4B, the two intersection points 136a and 136b are the divergence point 132a and the reconvergence location 132c, respectively. However, as shown in FIG. 5A, a deviation segment 132 intersecting a route 106 may form an intersection point 136 at a point along the deviation path 132b instead of at an end of the deviation path 132b. In this case, the deviation portion 132e is only part of the deviation path 132b. FIG. 5B illustrates the personalized route 102 generated by substituting the deviation portion 132e of the deviation segment 132 for the route portion 106b of the route 106 shown in FIG. 5A. In some cases, this form of imprecise matching may be implemented only after a direct match, such as a route deviation segment 132 having its divergence location 132a and reconvergence location 132c located directly on the route 106, cannot be found. Additionally, in some examples, imprecise matching may be used only in cases where it introduces a minimal amount of rerouting, such as a maximum of a five percent of the total route length. As such, longer deviation segments would lend themselves better to imprecise matching, since their length may justify the rerouting, but may otherwise prove to be inefficient for shorter deviation segments. Imprecise matching of a route 106 to deviation segments 132 that do not precisely overlap with the route 106 at the divergence point 132a and reconvergence location 132c allows for more adaptability in the generation of personalized routes 102.

Figure 6A:
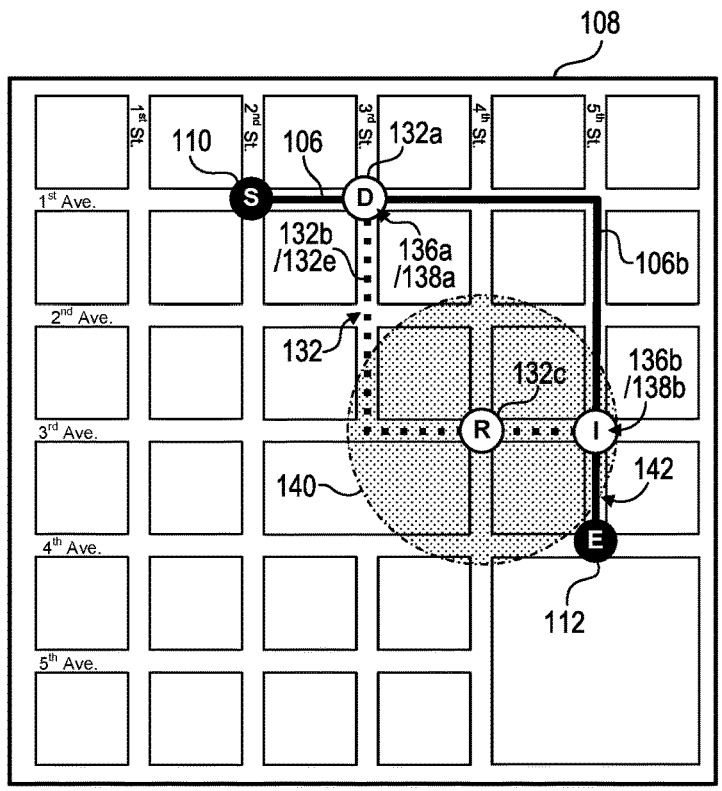
FIGS. 6A-6B illustrate another example scenario to generate a personalized route according to one embodiment of the present disclosure.
Figure 6B:
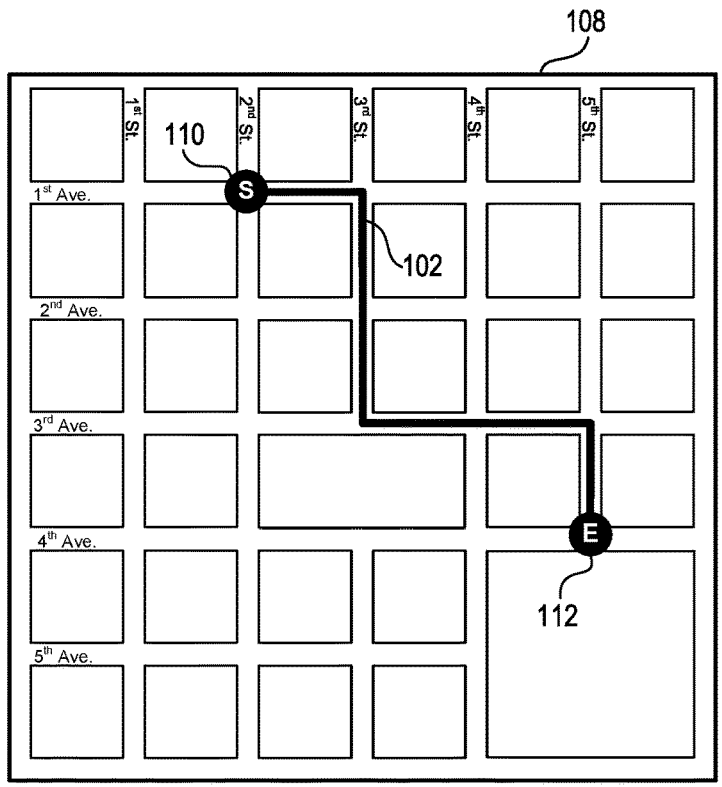

In any of the examples described herein, in addition to the deviation path 132b extending between the divergence location 132a and the reconvergence location 132c, the deviation path 132b may also extend a predetermined distance 140 in a plurality of directions from one or both of the divergence location 132a and the reconvergence location 132c. FIGS. 6A and 6B show the generation of a personalized route 102 from a deviation path 132b extending beyond the reconvergence location 132c to form a second intersection point 136b with the route 106. In this example, the predetermined distance 140 is slightly more than one block, and the intersection point 136b is preferentially formed at the last point along the route 106 that intersects the deviation path 132b without the deviation path 132b and the route 106 following the same path prior to meeting at the last intersection point 138b. For example, if the last intersection point 138b were located at point 142, then the route 106 and the deviation path 132b would following the same path between the intersection point 136b and the point 142. Thus, the last intersection point 138b is located at the intersection point 136b instead. Furthermore, if extending the deviation path 132b a predetermined distance 140 in a plurality of directions allows the deviation path 132b to intersect with the route 106 at multiple points, then the intersection point 136 furthest along the route 106 is preferentially used, similar to the selection of the last intersection point 138b described above. However, in other implementations, if extending the deviation path 132b a predetermined distance 140 in a plurality of directions allows the deviation path 132b to intersect with the route 106 at multiple points, any suitably definite predetermined criteria may be implemented to select the intersection point 136, such as selecting an intersection point 136 that converges with the route 106 in the shortest distance. This extension of deviation paths 132b allows for more combinations of deviation segment 132 substitution, possibly to be adaptability in the generation of personalized routes 102.

As described above, the route deviation information 114 may be generated and saved by one or more peer navigation devices 109 instead of by the navigation device 104. In this case, the navigation device 104 may be further configured to receive the route deviation information 114 via the one or more communication devices 126. Additionally, the one or more peer navigation devices 109 may be clustered into one or more predetermined groups 146. Predetermined groups 146 may be either input directly into the navigation device 104 via the one or more input devices 118 or determined based on one or more member lists accessed by the navigation device 104, such as contacts, family, friends, coworkers, or any relevant group. In other implementations, the navigation device 104 may be configured to create a predetermined group 146 by identifying peer navigation devices 109 in proximity to the navigation device, by identifying peer navigation devices 109 that frequently travel along a route 106, or any by identifying any group relevant to the user of the navigation device 104. By selecting a subset of peer navigation devices 109 from which to populate the route deviation information 114 used to generate the personalized routes 102 of the navigation device 104, the personalized routes 102 presented to a user of the navigation device 104 may be specifically tailored to the needs of the user.

In one example, the navigation device 104 may be configured to identify local "expert" peer navigation devices 109, whose route deviation information 114 covers the area of a route 106 being currently generated by the navigation device 104. By selecting to use "experts" as a predetermined group 146 of peer navigation devices 109 a user of the navigation device 104 may be presented with personalized routes 102 that allow the user to travel like a local, even if the user is in an unfamiliar location.

As described above, the one or more input devices 118 of the navigation device 104 may be further configured to receive user preferences 116, and the user preferences 116 may comprise at least an option to share 144 the route deviation information 114 with one or more predetermined groups 146. Additionally, the user preferences 116 may comprise an option to receive 148 stored route deviation information 114 from one or more predetermined groups 146. Selection of the option to share 144 the route deviation information 114 allows users to share their route deviation information 114 with their friends, family, or other predetermined group 146, and thus enhance the personalized routes 102 of the peer navigation devices 109 as well. Likewise, selection of the option to receive 148 stored route deviation information 114 from friends, family, or other predetermined group 146 may enhance the personalized routes 102 of the user. Furthermore, the user preferences may allow a user of the navigation device 104 to control a driver profile and also to select to share route deviation information 114 or individual deviation segments 132 with friends and family via social media or other sharing mechanisms. Thus allowing users to enhance the routing and travel experiences of those closest to them.

Figure 7:
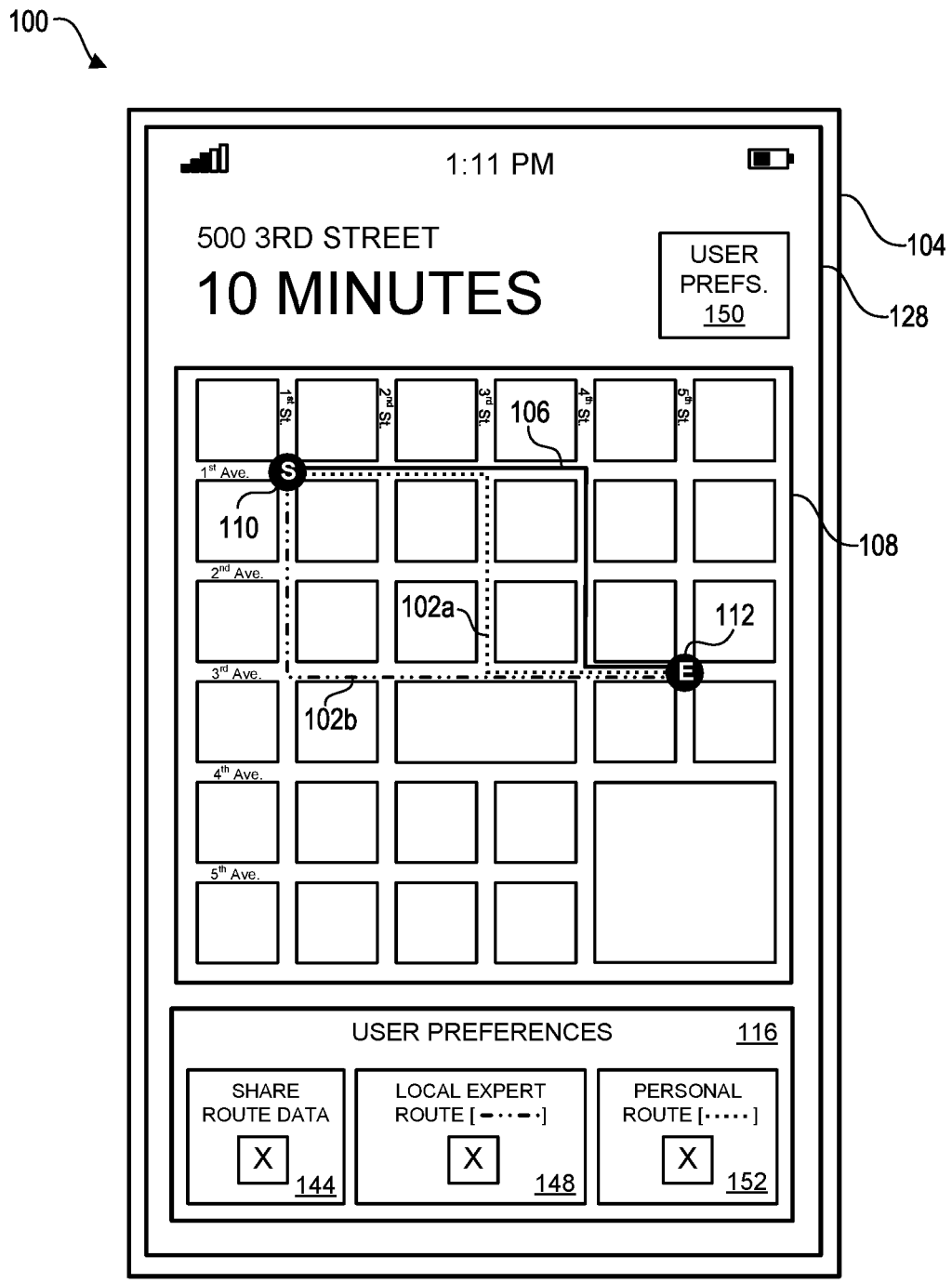
FIG. 7 shows a schematic diagram of an example navigation device of the computing system of FIG. 1.

FIG. 7 shows an example navigation device 104 with a display as an output device 128, the display being configured to output the route 106 and the one or more personalized routes 102. In this example, the navigation device 104 is displaying the route 106 and two personalized routes 102a and 102b. Selection of an option to set user preferences 150 allows a user of the navigation device 104 to access the option to share 144 the route deviation information 114 generated by the navigation device 104, the option to receive 148 route deviation information 114 from one or more predetermined groups 146, and an option to generate 152 a user-personalized route. The option to generate 152 the user-personalized route may cause the generation and output of the first personalized route 102a. The first personalized route 102a is generated using route deviation information 114 created by the navigation device 104 and shown here as a "Personal Route." The option to receive 148 route deviation information 114 from one or more predetermined groups 146 may also cause the generation and output of the second personalized route 102b. However, separate user preference selections may be made to receive peer route deviation information and to generate a peer-personalized route. Upon selection to generate the peer-personalized route, the second personalized route 102b is generated using route deviation information 114 created by peer navigation devices 109 and shown here as a "Local Expert Route." The predetermined group 146 of peer navigation devices 109 is determined via either selected or default user preferences 116, as described above. It should be obvious that the options described above may be accessed via a path other than the selection of an option to set user preferences 150, and may also be set via a default value.

Although the illustrated examples in FIGS. 1-7 depict routes that include one deviation segment, it will be appreciated that the system may be configured to include a plurality of deviation segments in a single final route transmitted to a user. For example, two, three, four, or more deviation segments may be included in a route. The calculation of each deviation segment may be performed in the manner described above.

Figure 8:
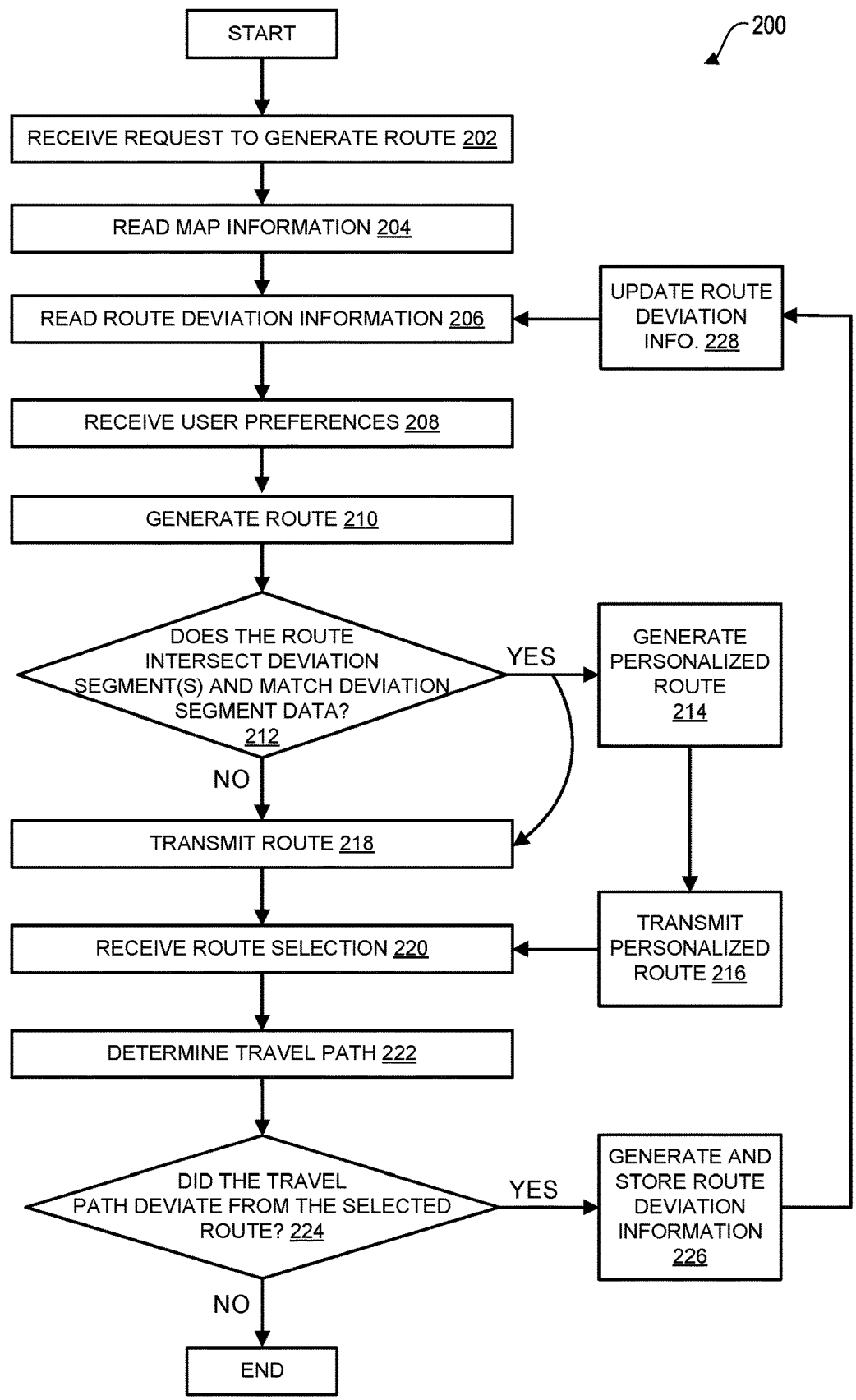
FIG. 8 shows a flowchart for a method of generating personalized routes.

FIG. 8 shows a flow diagram depicting an example method 200 implemented at least in part by a navigation device for generating personalized routes from route deviation information. The following description of method 200 is provided with reference to the software and hardware components described above and shown in FIGS. 1-7. It will be appreciated that method 200 also may be performed in other contexts using other suitable hardware and software components.

At 202, the method may include receiving a request to generate a route 106 from a starting location 110 to an ending location 112. In some examples, the request to generate the route 106 may be input into the navigation device 104 via an input device 118. However, the request to generate the route may also be sent via the navigation device 104 upon determination that a travel path 130 of the navigation device 104 is a frequently traveled route. At 204, the method may include reading stored map information 108. At 206, the method may further include reading route deviation information 114, wherein the route deviation information 114 includes one or more deviation segments 132 having a divergence location 132a, a deviation path 132b, a reconvergence location 132c, and deviation segment data 132d. As described above, in any of the examples described herein, the route deviation information 114 may either be generated by the navigation device 104, or generated by one or more peer navigation devices 109.

In some examples, the deviation path 132b may extend between the divergence location 132a and the reconvergence location 132c. However, the method may also incorporate deviation segments wherein the deviation path 132b further extends a predetermined distance 140 in a plurality of directions from one or both of the divergence location 132a and the reconvergence location 132c. Additionally, the deviation segment data 132d may include information about the deviation segment 132 and the context in which the deviation segment 132 is used. At 208, the method may further include receiving user preferences 116, as described above.

Continuing with method 200, at 210, the navigation device 104 may generate the route 106 with route data 106a based at least on the stored map information 108, the starting location 110 and the ending location 112. At 212, after generating the route 106, the navigation device 104 may then determine if each of the one or more deviation segments 132 included in the stored route deviation information 114 intersects the route 106 at a plurality of intersection points 136, and if a predetermined subset of the deviation segment data 132d matches a corresponding subset of the route data 106a. The predetermined subset of the deviation segment data 132d may be determined based on the user preferences 116. Although the predetermined subset of the deviation segment data 132d may be selected manually by a user of the navigation device 104, the predetermined subset of the deviation segment data 132d may also be automatically selected by the navigation device 104 as a part of default user preferences.

At 214, if the navigation device 104 determines that each of the one or more deviation segments 132 intersects with the route 106 at the plurality of intersection points 136 and the predetermined subset of the deviation segment data 132d matches the corresponding subset of the route data 106a, the navigation device 104 may then generate one or more personalized routes 102 by replacing a route portion 106b between a first intersection point 138a and a last intersection point 138b of the plurality of intersection points 136 with a corresponding deviation portion 132e for each intersecting deviation segment 132. Furthermore, the navigation device 104 may then output at least the route 106 and the personalized route 102 to an output device 128, as shown at 216 and 218.

If the navigation device 104 does not determine that each of the one or more deviation segments 132 intersects with the route 106 at the plurality of intersection points 136 or that the predetermined subset of the deviation segment data 132d matches the corresponding subset of the route data 106a, then the navigation device 104 may only transmit the route 106 to the output device 128, as shown at 218.

Continuing with method 200, at 220, if both the route 106 and the personalized route 102 are transmitted to the output device 128, then the navigation device 104 may then receive a route selection, the route selection being an indication that a user of the navigation device 104 wishes to follow either the route 106 or the personalized route 102. However, if only the route 106 is generated, then the route selection may automatically default to the route 106.

In another non-limiting example, the method may comprise receiving at least a location of the navigation device 104 via one or more location sensors 120 and tracking the location of the navigation device 104. At 222, the method may include using the tracked location of the navigation device 104 to determine a travel path 130 of the navigation device 104. At 224, the navigation device 104 may then determine if the travel path 130 deviates from the route 106. If it is determined that the travel path 130 does not deviate from the route 106, then the method is complete. However, upon determination that the travel path 130 deviates from the route 106, at 226, the method may further comprise generating one or more new deviation segments 154. Finally, after generating one or more new deviation segments 154, the navigation device 104 may then update the route deviation information 114 to include the one or more new deviation segments 154 at 228. As discussed above, the route deviation information 114 may be stored on a server in communication with the navigation device 104, thus updating the route deviation information 114 may include transmitting the one or more new deviation segments 154 to the server.

It will further be appreciated that method 200 is provided by way of example and is not meant to be limiting. Therefore, it is to be understood that method 200 may include additional and/or alternative steps relative to those illustrated in FIG. 8, and all or some steps of method 200 may be repeated for identifying any additional deviation segments. Thus, the method may be used to compute a route that includes a plurality of deviation segments. For example, two, three, four, or more deviation segments may be included in a single route, as some examples.

Further, it is to be understood that method 200 may be performed in any suitable order. Further still, it is to be understood that one or more steps may be omitted from method 200 without departing from the scope of this disclosure. In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
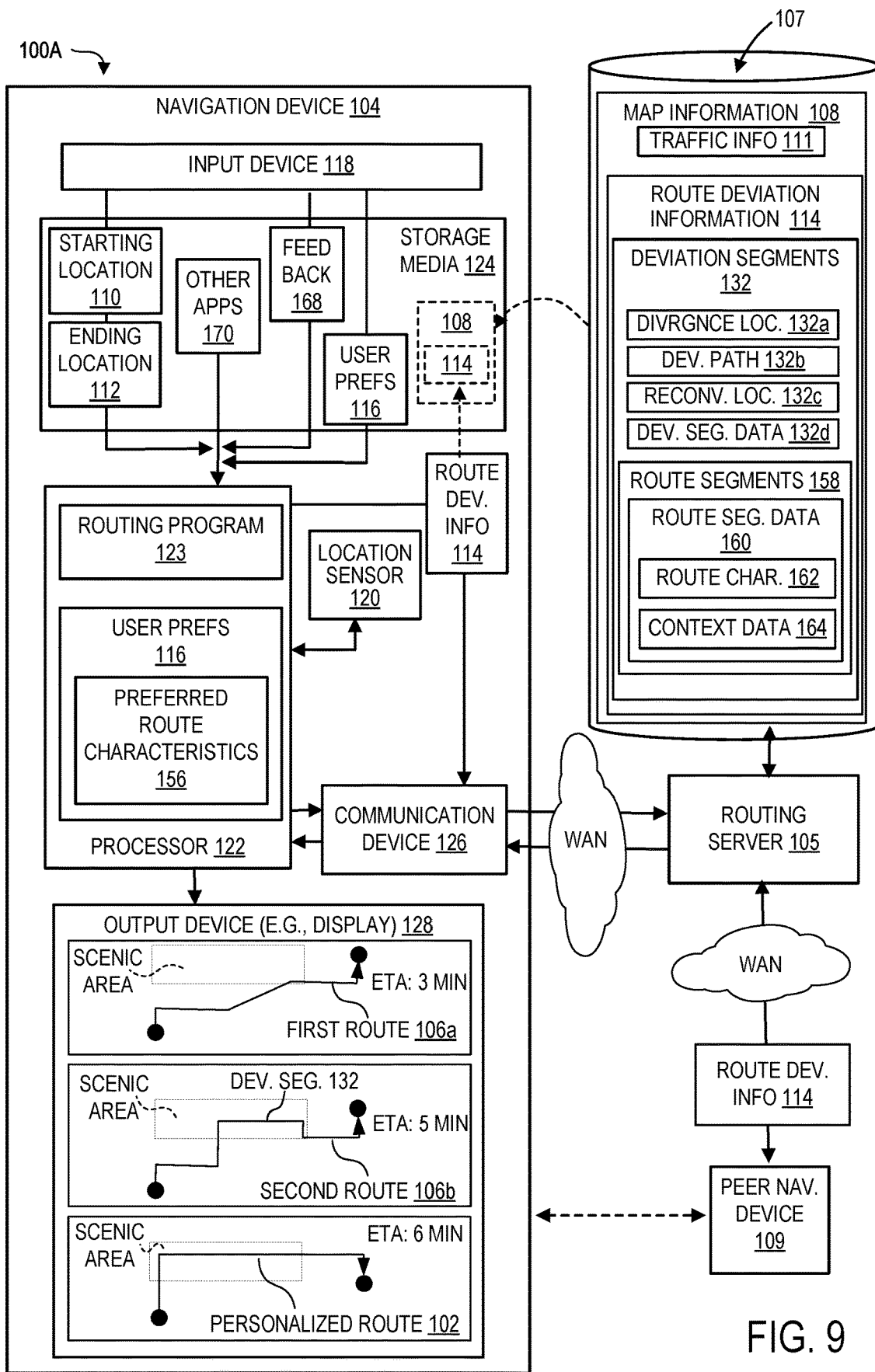
FIG. 9 shows a block diagram of another example computing system to generate personalized routes using preferred route characteristics.

In the previous discussion, the navigation device 104 may be configured to identify user navigation habits including common route deviations taken by the user when traveling familiar routes, and substitute those common route deviations into personalized routes generated by the navigation device when there are overlapping divergence and reconvergence locations along the generated route. Turning to FIG. 9, the navigation device 104 may be further configured to substitute in route segments that the user may not have driven before if those route segments have route characteristics that the navigation device 104 has associated with the user of the navigation device 104. For example, if the navigation device 104 has determined that the user prefers scenic routes, then the navigation device 104 may be configured to substitute scenic route segments into personalized routes generated for the user.

FIG. 9 illustrates an example computing device 100A in the form of the navigation device 104. As shown, the navigation device 104 may be configured to store user preferences 116 for the user of the navigation device. The user preferences 116 may include user route preferences for the user of the navigation device 104, the user route preferences indicating one or more preferred route characteristics 156 for the user. In the scenic route example, the user may have a habit of traveling along routes having more beautiful scenery, even if those routes take a longer time to travel between a stating location and an ending location than a time optimized route. Thus, in this example, the user route preferences for the user of the navigation device 104 may indicate a preferred route characteristic 156 of a scenic route characteristic.

As another example, the user may have a habit of taking routes with less stop-and-go traffic, fewer hills, or other characteristics that would reduce the energy consumption (i.e., electricity or fuel) of the vehicle while traveling along that route, even though that route may take longer than a time optimized route that is less energy efficient. Thus, in this example, the user route preferences for the user of the navigation device 104 may indicate a preferred route characteristic 156 of an energy saving route characteristic.

As another example, the user may have a habit of taking routes that do not have a toll or other route associated monetary costs, even though that route may take longer than a time optimized route. Accordingly, the user route preferences may indicate a preferred route characteristic 156 of a cost saving route characteristic.

As another example, the user may have a habit of taking routes that have less difficult turns and other types of difficult to navigate characteristics, even though that route may take longer than a time optimized route. Accordingly, the user route preferences may indicate a preferred route characteristic 156 of an easy navigation difficulty route characteristic. On the other hand, if the user prefers a more difficult route, the user route preferences may indicate a preferred route characteristic 156 of a hard navigation difficulty route characteristic.

As another example, the user may have a habit of taking routes that have less unclearly marked segments, areas with poor line of sight, and other characteristics that degrade route visibility, even though that route may take longer than a time optimized route. Accordingly, the user route preferences may indicate a preferred route characteristic 156 of a route visibility characteristic.

As another example, the user may have a habit of taking routes that have more easily accessible amenities, such as public bathrooms, gas stations, restaurants, etc., even though that route may take longer than a time optimized route. Accordingly, the user route preferences may indicate a preferred route characteristic 156 of a route convenience characteristic.

As another example, the user may have a habit of taking routes that have a lower speed limit, barriers between the lanes going different directions, and other characteristics that improve the user's safety while traveling the route. Accordingly, the user route preferences may indicate a preferred route characteristic 156 of a route safety characteristic.

It will be appreciated that the types of route characteristics described above are merely exemplary, and that other types of route characteristics may be used by the navigation device 104 to categorize and tag the user's navigation habits and preferred route characteristics.

Figure 10:
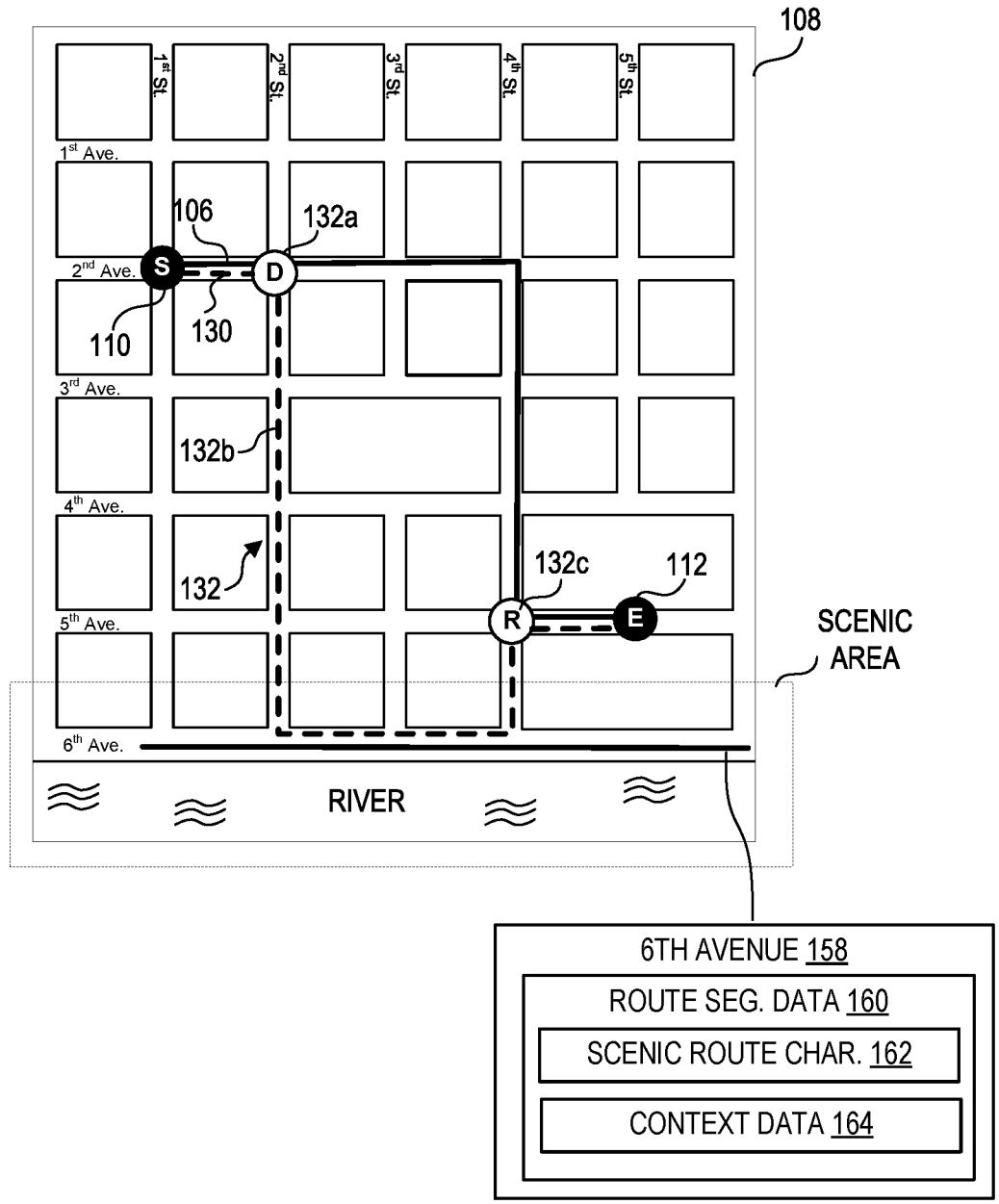
FIG. 10 illustrates an example route and travel path using the example computing system of FIG. 9.

The one or more preferred route characteristics 156 may be determined by the processor 122 via processes and methods described below, and stored in the user preferences 116 on the storage media 124 of the navigation device 104. In one example, the processor 122 of the navigation device 104 may be configured to determine a preferred route characteristic 156 of the user based on at least a route characteristic 162 of a deviation segment 132 selected by the user. The processor 122 may be configured to determine that the user has selected a deviation segment 132 when the user's travel path deviates from an automatically generated route, similarly to the methods described above. That is, the one or more location sensors 120 of the navigation device 104 may determine a travel path 130 of the user, and the processor 122 may be configured to detect deviations of the travel path 130 from a route selected by the user. Turning to FIG. 10, in the illustrated example, the user has selected a route 106 generated by the navigation device 104 in response to a request by the user of the navigation device 104 for a route from the starting location 110 to the ending location 112. However, while driving along the selected route 106, the user's travel path 130 deviates from the selected route 106 at a divergence location 132a, travels along a deviation path 132b, and rejoins the selected route 106 at a reconvergence location 132c. Next, the processor 122 may determine the deviation segment 132 based on the detected deviations. In the example illustrated in FIG. 10, the deviation path 132b is detected as a deviation segment 132 that is selected by the user of the navigation device 104.

The processor 122 may then determine a preferred route characteristic 156 based on a route characteristic 162 of the determined deviation segment 132 along the deviation path 132b. In one example, the route characteristics 162 of a deviation segment 132 may be determined based on a route characteristic 162 of known route segments 158 that have overlapping segments with the deviation segment 132.

As illustrated in FIG. 9, the server-accessible database 107 may further store route segment data 160 for known route segments 158, the route segment data 160 including route characteristics 162 and context data 162 for the route characteristics 162. Each route segment 158 may have a determined relationship with one or more associated route characteristics 162, such as a scenic route characteristic, an energy saving route characteristic, a cost saving route characteristic, a hard navigation difficulty route characteristic, an easy navigation difficulty route characteristic, a route visibility characteristic, a route convenience characteristic, a route safety characteristic, or other types of route characteristics.

The route characteristics 162 for these route segments 158 may be determined by the routing server 105 based on the map information 108. For example, the map information 108 may include data retrieved from third party databases that tag scenic routes across the United States. Based on the retrieved data, the routing server 105 may tag corresponding route segments 158 with the scenic route characteristic. In this manner, data from various third parties may be included in the map information 108 and used to tag route segments 158 with one or more route characteristics 162.

In another example, the routing server 105 may tag route segments 158 based on other types of data associated with each route segment. For example, the routing server 105 may tag route segments 160 going through mountains or along rivers with the scenic route characteristic. Route segments 158 having left turns across a lane with incoming traffic may be tagged with a hard navigation difficulty route characteristic and a route safety characteristic indicating that the route segment is potentially less safe. Route segments 158 that include toll booths may be tagged with a negative cost saving route characteristic. It will be appreciated that the tagging examples described above are merely exemplary, and that other types of scenarios may also be used to tag each route segment 160 with a corresponding route characteristic 162.

The route segment data 160 for each route segment 158 stored on the server-accessible database 107 may further include context data 164 for each determined route characteristic 162. The context data 164 may include a time of day, a day of year, and/or a weather condition of the route for each determined route characteristic 162. For example, a route segment may have a higher navigation difficulty during a snowing weather condition than during a sunny weather condition. Thus, that route segment may have an easy navigation difficulty route characteristic during a sunny weather condition context and a hard navigation difficulty route characteristic during a snowing weather condition context. As another example, a route segment may have good visibility during the day and bad visibility at night. Thus, that route segment may have a good route visibility characteristic during a day time of day context, and may have a bad route visibility characteristic during a night time of day context. In this manner, each route characteristic 162 for each route segment 158 may have associated context data 162 indicating the circumstances under which that route segment exhibits the route characteristic.

As illustrated in FIG. 9, relevant portions of the map information 108 and the route deviation information 114 including the route segments 158 and associated route segment data 160 described above may be retrieved from the server-accessible database 107 and stored on the storage media 124 of the navigation device 104. After detecting a user selected deviation segment 132, the processor 122 may be configured to compare the user selected deviation segment with the route segments 158 to determine which route segments 158 overlap with the user selected deviation segment. Next, the processor 122 may be configured to determine that the user selected deviation segment has one or more of the route characteristics 162 associated with the overlapping route segments 158, and increase a score or confidence value that the user prefers those one or more route characteristics 162, and correspondingly update the user's preferred route characteristics 156.

Turning again to FIG. 10, the processor 122 compares the deviation segment 132 along deviation path 132b that was selected by the user to the stored route segments. In this particular example, the processor 122 of navigation device 104 determines that the selected deviation segment overlaps a known route segment 158 along 6th Avenue. The 6th Avenue route segment is nearby a river, and thus may have been tagged by the routing server 105 as being a scenic route. Thus, the 6th Avenue route segment includes route segment data 160 indicating that the 6th Avenue route segment has a scenic route characteristic, and may further include context data 164 for that scenic route characteristic. As the 6th Avenue route segment overlaps with the user selected deviation segment, the processor 122 may be configured to determine that the user selected deviation segment 132 along deviation path 132b also has a scenic route characteristic and the associated context data 164. Accordingly, the processor 122 may increase a score value or confidence value that the user of the navigation device prefers the scenic route characteristic, and corresponding update the user's preferred route characteristic 156 stored in the user preferences 116 on storage media 124.

In the above example, the processor 122 determined that the deviation segment 132 was selected by the user based on detecting a deviation in the user's travel path from a generated route. In another example, the processor 122 may be configured to determine the deviation segment 132 based on a user selection of a route from among a plurality of different routes. In the example illustrated in FIG. 9, the user of the navigation device 104 has entered a standing location 110 and an ending location 112. Next, the routing program 123 executed by the processor 122 may be configured to generate at least two different routes from the starting location 110 to the ending location 112. In the illustrated example, both a first route 106a and a second route 106b are generated by the routing program 123 and presented to the user via the output device (e.g. display) 128. In this example, the first route 106a has a faster estimated time of arrival than the second route 106b, but the second route 106b has a route segment having a scenic route characteristic.

The processor 122 may be further configured to receive a user selection of one of the at least two different routes via the input device 118, and determine the deviation segment based on a route difference between the at least two different routes. As illustrated, the second route 106b has a route difference from the first route 106a which includes a route segment that travels through a scenic area, such as by a river or through a mountain. If the user selects the second route 106b, then the processor 122 may be configured to determine that the route difference is a deviation segment 132 selected by the user, as the user specifically selected the second route 106b over the first route 106a even though the first route 106a has a faster estimated time of arrival. Thus, the user selected the route based on a metric other than time optimization. Accordingly, the processor 122 may be configured to determine that the user prefers the route characteristics of the deviation segment 132, and thus may increase a score value or confidence value for those route characteristics. The route characteristic of the user selected deviation segment 132 may be determined as discussed above by comparing the user selected deviation segment to the route segments 158 stored on storage media 124.

Figure 11B:
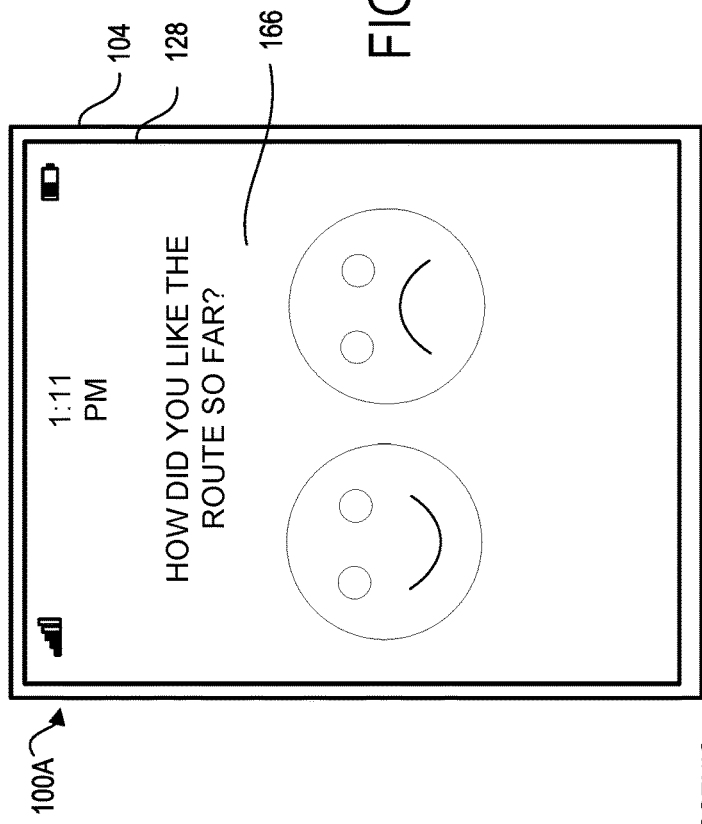
FIG. 11B illustrates an example graphical user interface using the example computing system of FIG. 9.
Figure 11C:
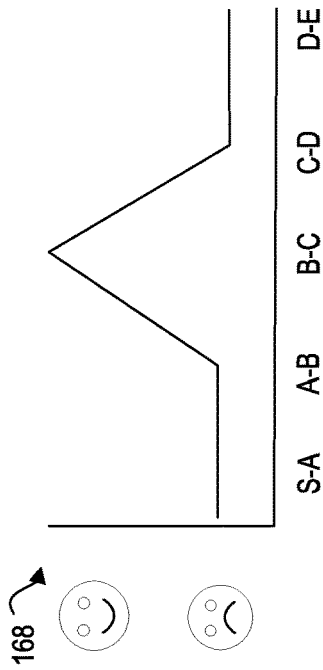
FIG. 11C illustrates a graph of example intraroute feedback received by the example computing system of FIG. 9.
Figure 11A:
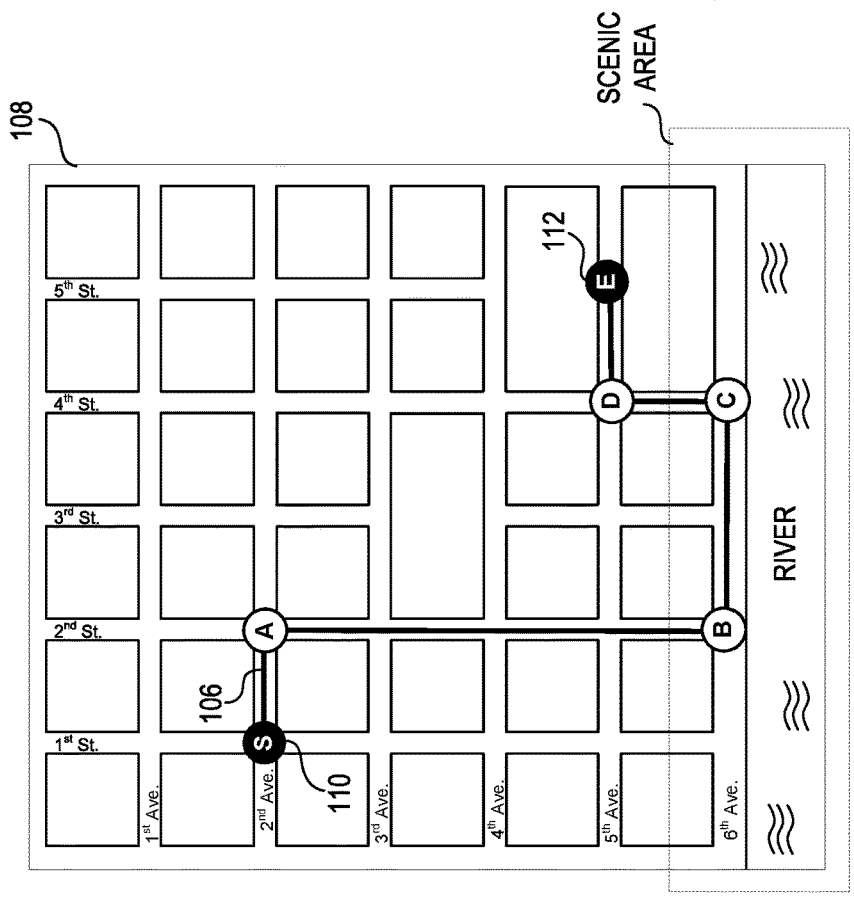
FIG. 11A illustrates an example route and travel path using the example computing system of FIG. 9.

Turning to FIG. 11A, the processor 122 of navigation device 104 may be further configured to determine the one or more preferred route characteristics of the user based on intraroute feedback. In the illustrated example, the user is traveling along the route 106 from the first location 110 to the second location 112. As the user is traveling along the route 106, the processor 122 may be configured to detect that the navigation device has come to a stop, or otherwise slowed down to a safe speed, via one or more location sensors 120. Based on at least detecting that the navigation device has come to a step, the processor 122 is further configured to display a graphical user interface (GUI) element 166 configured to receive intraroute feedback 168 during the stop via the output device 128 (e.g. display) of the navigation device 104, as illustrated in FIG. 11B. In this example, the GUI element 166 includes a happy face element and an unhappy face element which are configured to receive intraroute feedback from the user of the navigation device 104 during travel of a route 106 including one or more route segments via a tap input to the input device 118. However, it will be appreciated that the intraroute feedback may be received via other types of input mechanisms, such as a voice input to a microphone input device, or graphical input of differing design from that depicted. Additionally, it will be appreciated that the intraroute feedback may be elicited from the user by the navigation device 104 via other means, such as outputting a predetermined sound output (e.g. "How do you like the route so far?") via speakers of the navigation device 104, and processing a voice reply of the user.

In the illustrated example of FIG. 11B, the GUI element 166 is displayed five times during the route 106 of FIG. 11A, at stop A, stop B, stop C, stop D, and at the ending location 112 along the route 106, thus forming the route segments S-A, A-B, B-C, C-D, and D-E. FIG. 11C shows an example of intraroute feedback 168 received at each stop along the route 106 shown in FIG. 11A. As illustrated, the user selected the unhappy face intraroute feedback at stops A, B, D, and the ending location, indicating that the user did not prefer route segments S-A, A-B, C-D, and D-E. On the other hand, the user selected the happy face intraroute feedback at stop C, indicating that the user preferred route segment B-C.

After receiving the intraroute feedback 168, the processor 122 of the navigation device 104 may be configured to determine a preferred route characteristic 156 of the user of the navigation device 104 based on at least the intraroute feedback 168 and route characteristics 162 of the one or more route segments of the route 106. In the illustrated example, the intraroute feedback 168 shown in FIG. 11C indicates that the user preferred the route segment B-C. Thus, the processor 122 may be configured to determine a preferred route characteristic 156 of the user based on the route segment B-C. In this example, the route segment B-C of route 106 shown in FIG. 11A is along the river, and overlaps with the 6th Avenue route segment discussed above. Similarly, as the 6th Avenue route segment has a scenic route characteristic, the processor 122 may be configured to determine that the route segment B-C also has a scenic route characteristic. Accordingly, the processor 122 may be configured to determine that the user of the navigation device 104 prefers the scenic route characteristic, as the user entered a happyface intraroute feedback during that route segment B-C, and may increase a score value or confidence value for the scenic route characteristic.

On the other hand, as the user input unhappy intraroute feedback during the route segments S-A, A-B, C-D, and D-E, the processor 122 may be configured to decrease a score value or confidence value for route characteristics associated with the route segments S-A, A-B, C-D, and D-E. In this manner, the processor 122 may be configured to modify score values or confidence values for route characteristics based on received intraroute feedback. Additionally, it will be appreciated that while the above examples include determining that the user prefers the scenic route characteristic based on intraroute feedback, all of the types of route characteristics described above, such as, for example, an energy saving route characteristic, a cost saving route characteristic, an easy navigation difficulty route characteristic, a hard navigation difficulty route characteristic, a route visibility characteristic, a route convenience characteristic, and a route safety characteristic, may also be determined for the preferred route characteristics 156 of the user based on intraroute feedback.

Turning again to FIG. 9, the processor 122 may be further configured to determine a preferred route characteristic 156 of the user of the navigation device 104 based on at least user input to the navigation device 104. For example, in a set-up phase, the navigation device 104 may be configured to present a list of one or more of the route characteristics described above via the output device 128, and receive user input of a user selection of one or more of the route characteristics from the list via the input device 118. Next, the processor 122 may be configured to update the preferred route characteristics 156 for the user based on the user selections. In another example, the navigation device 104 may include a settings options that allows the user to select or deselect specific route characteristics. For example, the processor 122 may be configured to automatically determine one or more preferred route characteristics 156 for the user according to the processes described herein, and the user may subsequently deselect one or more of those automatically determined preferred route characteristics 156 via a user input if the user believes that the determined preferred route characteristic was incorrect.

In another example, the processor 122 may be further configured to determine a preferred route characteristic 156 of the user of the navigation device 104 based on at least one or more applications 170 installed by the user on the navigation device 104. For example, the processor 122 may be configured to request a list of installed applications from an operating system executed on the navigation device 104, and determine preferred route characteristics 156 of the user based on the list of installed applications. As a specific example, if the user has installed a racing game application, then the processor 122 may be configured to determine that the user may prefer route segments with a higher speed limit, route segments with windier turns, and other types of route characteristics. As another specific example, if the user has a coupon application installed on the navigation device 104, the processor 122 may be configured to determine a cost saving route characteristic for the user's preferred route characteristics 156. It will be appreciated that the above examples of installed applied and corresponding preferred route characteristics are merely exemplary, and that the processor 122 may be configured to determine the preferred route characteristics 156 based on other suitable categories of applications 170.

The preferred route characteristics 156 for the user determined via the processes and methods described above may be stored in the user preferences 116 on the storage media 124, and iteratively updated as the user continues to interact with the navigation device 104 over time. Additionally, the routing program 123 executed by the processor 122 of the navigation device 104 may be further configured to generate personalized routes 102 for the user based on these determined preferred route characteristics 156.

As illustrated in FIG. 9, the processor 122 may be configured to receive a request for a route from a starting location 110 to an ending location 112 via the one or more input devices 118. The processor 122 may be configured to retrieve user route preferences for the user of the navigation device 104, the user route preferences indicating one or more preferred route characteristics 156 for the user. The one or more preferred route characteristics 156 may be determined via any of the processes and methods described above. The processor 122 may be further configured to read stored map information 108 including a plurality of route segments 158, each route segment including route segment data 160 indicating one or more route characteristics 162 of that route segment 158. The route segment data 160 may further include context data 164 indicating a time of day, a day of year, and/or a weather condition associated with each of the one or more route characteristics 162.

Next, the processor 122 may be configured to generate a personalized route 102 that includes at least one route segment 158 having route segment data 160 indicating at least one of the one or more preferred route characteristics 156 of the user. For example, the routing program 123 of the processor 122 may be configured to splice in route segments 158 included in the stored map information 108 that have route characteristics 162 having a high match with the preferred route characteristics 156 of the user. The processor 122 may be further configured to determine the match based on the context data 164 associated with the route characteristics 162 of the route segments 158 with a current context of the navigation device 104, such as, for example, a current time of day, a current day of the year, and/or a current weather condition. If the context data 164 does not match the current context of the navigation device 104, then the corresponding route characteristic may be determined to have a low match at that current point in time.

The processor 122 may be configured to splice the route segments 158 into the personalized route 102 similarly to the process for splicing deviation segments 132 by utilizing divergence locations and reconvergence locations. In one specific example, if the user's preferred route characteristics 156 indicate a scenic route characteristic, then the routing program 123 may be configured to splice in one or more route segments from the stored map data that also have a scenic route characteristic and have divergence locations and reconvergence locations that overlap or are within a threshold distance of a generated route from the starting location 110 to the ending location 112. After generating the personalized route 102, the processor 122 may be configured to display the personalized route 102 to the user via the output device 128 (e.g. display device).

Figure 12:
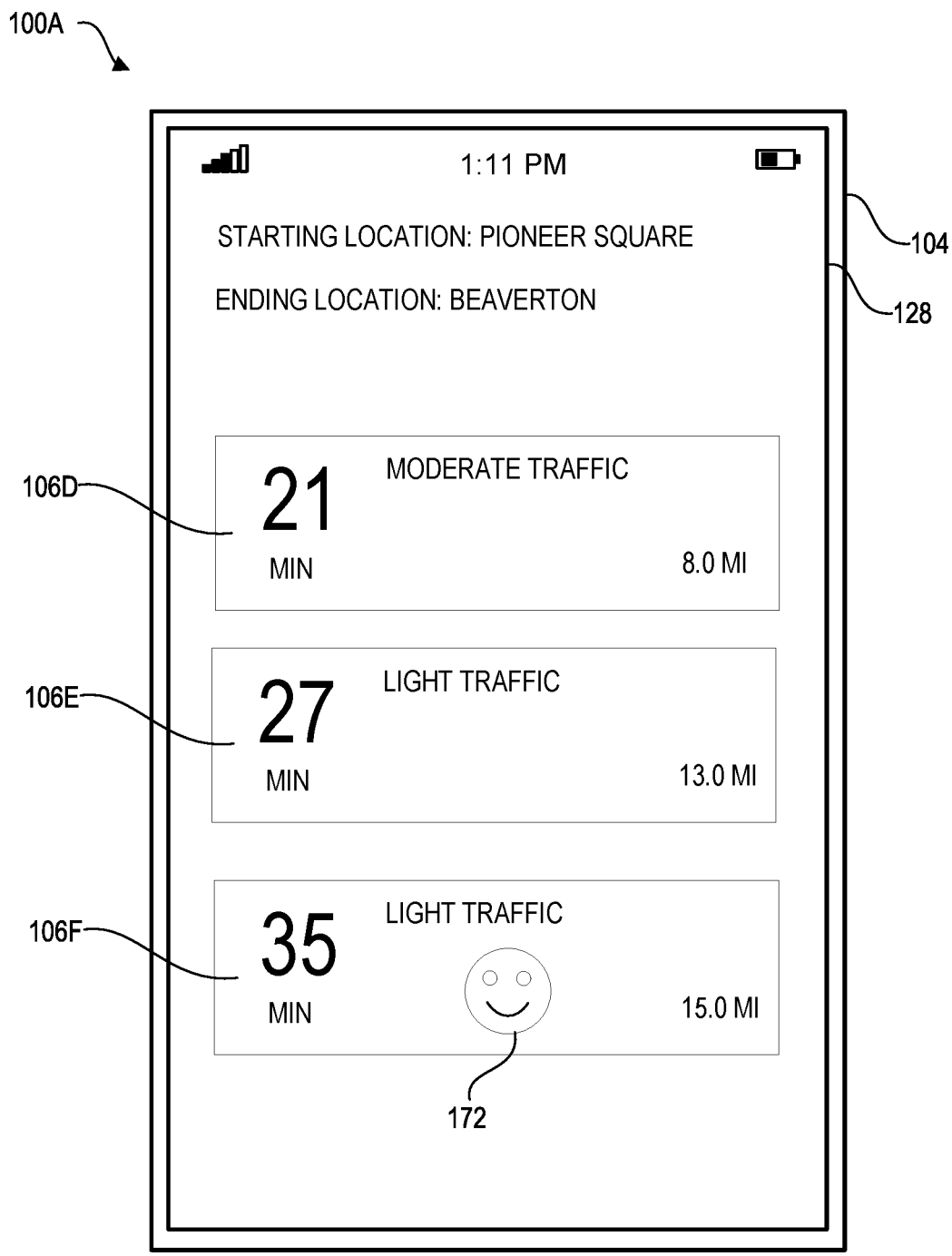
FIG. 12 illustrates an example graphical user interface using the example computing system of FIG. 9.

In another example, the routing program 123 executed by the processor 122 may be configured to generate a plurality of alternative routes from the starting location 110 to the ending location 112. The plurality of alternative routes are not necessarily generated based on the user's preferred route characteristics 156, but may be generated to have a threshold difference in route segments between the starting location 110 and the ending location 112. Turning to FIG. 12, the processor 122 has generated three alternative routes 106D, 106E, and 106F, from the starting location 110 to the ending location 112. Next, the processor 122 may be configured to determine which route among the plurality of alternative routes includes route segments has a highest match with the one or more preferred route characteristic 156 of the user. For example, the processor 122 may be configured to compare the plurality of alternative routes, such as routes 106D, 106E, and 106F, to the stored map data including the route segments 158, and determine which route segments each of the plurality of alternative routes overlaps. The processor 122 may then tag each of the alternative routes with route characteristics 162 corresponding to the overlapping route segments 156 in the stored map data. The processor 122 may further calculate a match value for each of the alternative routes, the match value indicating how closely that route matches the user's preferred route characteristics.

Next, the processor 122 may be configured to display that route having the highest match value with an indication 172 that the route matches the user's preferred route characteristics. In the example illustrated in FIG. 12, the third route 106F of the plurality of alternative routes generated by the processor 122 has the highest match value. Accordingly, the processor 122 displays the third route 106F with the indication 172, which, in this specific example, is a happyface visual element. In one example, the processor 122 may be configured to display the indication 172 only if the associated route both has the highest match value, and is above a threshold match value. In another example, the processor 122 may be configured to display the indication 172 for each route of the plurality of alternative routes that has a match value above the threshold match value. Additionally, it will be appreciated that while the indication 172 is illustrated as a happyface GUI element, the indication 172 may take any suitable form, such as, for example, a visual high light, an icon, an auditory indication, etc.

Turning again to FIG. 9, the navigation device 104 may be further configured to communicate with a peer navigation device 109 via Bluetooth, WiFi, or another suitable communication network. In one example, the user of the navigation device 104 may be riding in the same vehicle as a peer user. In this example, the processor 122 may be configured to detect that the peer user of the peer navigation device is traveling with the user of the navigation device 104 by comparing location data detected via the location sensor 120 to the peer's location data detected via the peer navigation device's location sensors. However, it will be appreciated that the processor 122 may detect that the peer user of the peer navigation device is traveling with the user of the navigation device 104 via other suitable techniques. For example, the navigation device 104 may communicate with the peer navigation device 109 via a Bluetooth or WiFi connection. If the connection persists for a threshold amount of time, then the processor 122 of each navigation device may determine that they are traveling together.

After establishing a connection with the peer navigation device 109, the processor 122 may be configured to retrieve peer user route preferences for a peer user of the peer navigation device 109, the peer user route preferences indicating one or more preferred route characteristics 156 of the peer user. The peer navigation device 109 may be implementing the same processes and methods described herein, and thus may also determine one or more preferred route characteristics 156 for the peer user. These one or more preferred route characteristics 156 for the peer user are received by the user's navigation device, which may be further configured to generate the personalized route 102 to further include at least one route segment having route segment data indicating at least one of the one or more preferred route characteristics of the peer user. For example, the routing program 123 executed by the processor 122 may be configured to combine the one or more preferred route characteristics 156 of the user with the one or more preferred route characteristics of the peer user. Thus, when generating the personalized route 102, the processor 122 may be configured to match the route characteristics of the route segments stored in the map information to the combined preferred route characteristics of the user and the peer user, and splice in route segments having a high match with the combined preferred route preferences into the personalized route 102 according to the techniques described above.

Figure 13:
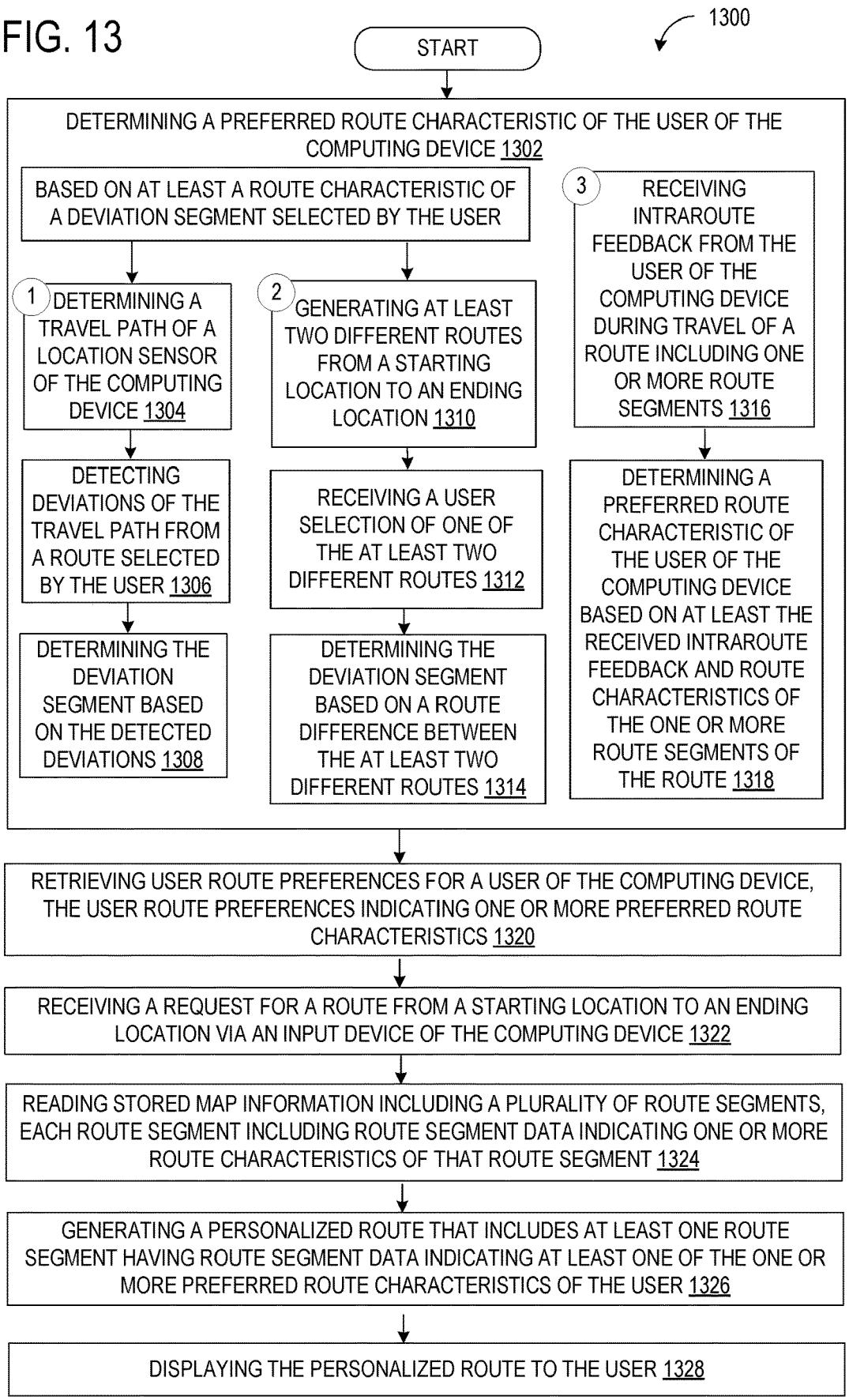
FIG. 13 is a flowchart illustrating a method for generating a personalized route implemented by the example computing system of FIG. 9.

FIG. 13 shows a flowchart illustrating an example method 1300. Method 1300 may be implemented at a processor of a computing device, such as the navigation device 104 described herein, for example.

At 1302, the method 1300 may include determining a preferred route characteristic of the user of the computing device. Step 1302 may include three sets of substeps, which may be implemented at the processor optionally or alternatively.

At set (1), the method 1300 may include determining the preferred route characteristic of the user of the computing device based on at least a route characteristic of a deviation segment selected by the user. At 1304, the method may include determining a travel path of a location sensor of the computing device. The computing device, such as the navigation device 104 for example, may include one or more location sensors configured to detect a travel path of the one or more location sensors, and send the location data to the processor of the computing device.

At 1306, the method 1300 may include detecting deviations of the travel path from a route selected by the user. The route may be generated in response to a request for a route from a starting location to an ending location. After the user of the computing device selects a route, the processor 122 may be configured to detect whether the user deviates from the selection route based on the location data received from the one or more location sensors.

At 1308, the method 1300 may include determining the deviation segment based on the detected deviations. After determining the deviation segment, the processor of the computing device implementing the method 1300 may be configured to determine the preferred route characteristic of the user of the computing device.

At set (2), the method 1300 may also include determining the preferred route characteristic of the user of the computing device based on at least a route characteristic of a deviation segment selected by the user. At 1310, the method 1300 may include generating at least two different routes from a starting location to an ending location. The at least two routes may be generated in response to a request for a route from a starting location to an ending location. The at least two routes are generated to have at least a threshold difference in the route segments that comprise each of the at least two routes.

At 1312, the method 1300 may include receiving a user selection of one of the at least two different routes. The user may select the route via any suitable input method. For example, the user may enter a touch input to a GUI element to select from among the at least two different routes. Further, the at least two different routes may be presented to the user in an organized list, with faster routes being placed higher in the list.

At 1314, the method 1300 may include determining the deviation segment based on a route difference between the at least two different routes. After determining the deviation segment, the processor of the computing device implementing the method 1300 may be configured to determine the preferred route characteristic of the computing device.

For both set (1) and set (2), the processor of the computing device may be configured to determine the preferred route characteristic by determining a route characteristic of the deviation segment selected by the user. In one example, the processor may compare the deviations segment to route segments 158 in stored map data received from a server-accessible database 107. The route segments 158 may include associated route characteristics 162 that are determined by a routing server 105. The processor of the computing device may be configured to determine which of the route segments 158 overlap the deviation segment, and determine the preferred route characteristic based on the route characteristic associated with the overlapping route segment 158.

At set (3), the method 1300 may include determining the preferred route characteristic of the user of the computing device based on intraroute feedback. At 1316, the method 1300 may include receiving intraroute feedback from the user of the computing device during travel of a route including one or more route segments. In one example, the processor of the computing device may be configured to detect that the navigation device has come to a stop, or otherwise slowed down to a safe speed, via one or more location sensors 120, and display a graphical user interface (GUI) element 166 configured to receive intraroute feedback 168 during the stop via the output device 128 (e.g. display) of the navigation device 104. In this manner, the intraroute feedback may be safely elicited from the user.

At 1318, the method 1300 may include determining a preferred route characteristic of the user of the computing device based on at least the received intraroute feedback and route characteristics of the one or more route segments of the route. The processor of the computing device may be configured to determine which of the route segments of the route received positive feedback from the user. Next, the processor may determine route characteristics for those route segments with positive feedback by comparing those route segments to the stored map data, which includes route segments and associated route characteristics. The processor may then determine that the route characteristics of those route segments having positive feedback are preferred route characteristics for the user.

After determining one or more preferred route characteristics of the user of the computing device, the processor of the computing device implementing the method 1300 may be configured to store the one or more preferred route characteristics on a storage media.

Next, the method 1300 may advance from 1302 to 1320, and may include retrieving user route preferences for a user of the computing device, the user route preferences indicating one or more preferred route characteristics. The one or more preferred route characteristics may be determined by the processor at step 1302 of method 1300. Further, the computing device may be configured to receive user input of a selection or deselection of one or more preferred route characteristics via an input device of the computing device.

At 1322, the method 1300 may include receiving a request for a route from a starting location to an ending location via an input device of the computing device. The starting location and ending location may be input via any suitable input techniques. For example, the starting location and ending location may be input via a touch screen and virtual keyboard. As another example, the starting location and ending location may be input via a microphone.

At 1324, the method 1300 may include reading stored map information including a plurality of route segments, each route segment including route segment data indicating one or more route characteristics of that route segment. The stored map information may be retrieved from a server-accessible database 107 over a WAN. The stored map information includes route segments 158 and route segment data 160 indicating determined route characteristics 162 and associated context data 164 for each route segment.

At 1326, the method 1300 may include generating a personalized route that includes at least one route segment having route segment data indicating at least one of the one or more preferred route characteristics of the user. The processor of the computing device implementing the method 1300 may be configured to generate the personalized route by splicing in route segments from the stored map information that have route characteristics 162 having a high match with the preferred route characteristics 156 of the user. The processor of the computing device may splice in the route segments according to the convergence and reconvergence techniques described herein.

At 1328, the method 1300 may include displaying the personalized route to the user. The personalized route may be displayed via an output device of the computing device, such as, for example, a display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
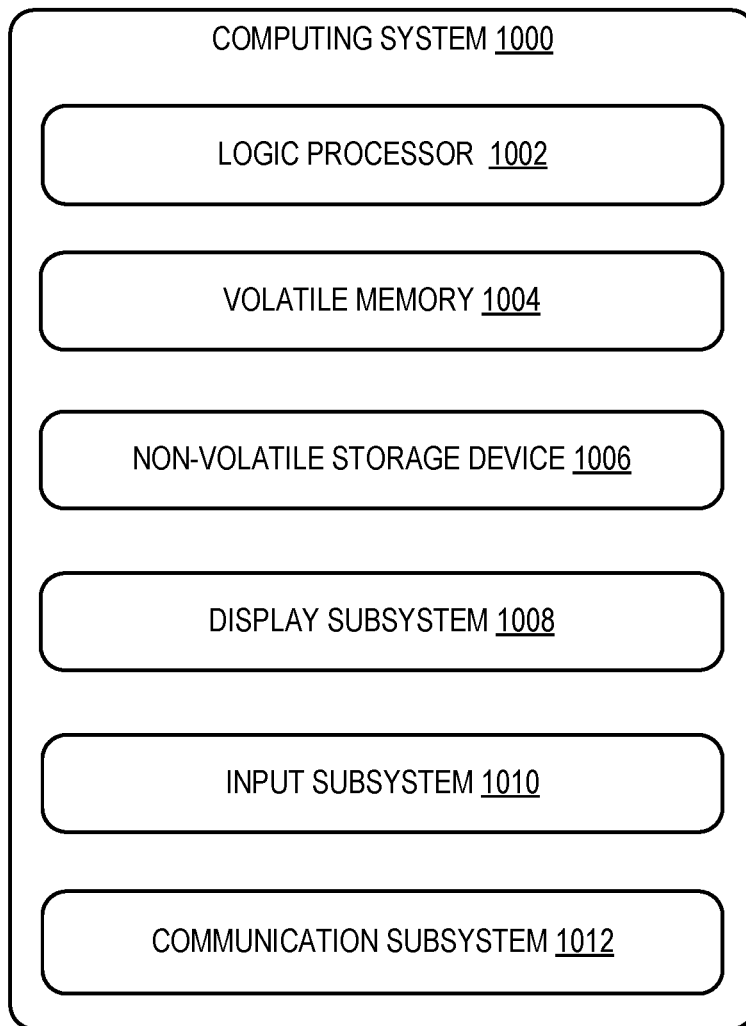
FIG. 14 shows a computing system according to an embodiment of the present description.

FIG. 14 schematically shows a non-limiting embodiment of a computing system 1000 that can enact one or more of the methods and processes described above. Computing system 1000 is shown in simplified form. Computing system 1000 may take the form of one or more navigation devices as shown in FIGS. 1 and 9, or one or more devices cooperating with a navigation device (e.g., personal computers, server computers, tablet computers, home-entertainment computers, network computing devices, gaming devices, mobile computing devices, mobile communication devices (e.g., smart phone), and/or other computing devices).

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 14.

Logic processor 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. This visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1012 may be configured to communicatively couple computing system 1000 with one or more other computing devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs provide additional support for the claims of the subject application. One aspect provides a navigation device, comprising one or more input devices configured to receive starting and ending locations for route navigation, and a processor configured to retrieve user route preferences for a user of the navigation device, the user route preferences indicating one or more preferred route characteristics, receive a request for a route from a starting location to an ending location via the one or more input devices, read stored map information including a plurality of route segments, each route segment including route segment data indicating one or more route characteristics of that route segment, generate a personalized route that includes at least one route segment having route segment data indicating at least one of the one or more preferred route characteristics of the user, and display the personalized route to the user. In this aspect, additionally or alternatively, the one or more preferred route characteristics may be selected from the group consisting of a scenic route characteristic, an energy saving route characteristic, a cost saving route characteristic, an easy navigation difficulty route characteristic, a hard navigation difficulty route characteristic, a route visibility characteristic, a route convenience characteristic, and a route safety characteristic. In this aspect, additionally or alternatively, the processor may be further configured to determine a preferred route characteristic of the user of the navigation device based on at least a route characteristic of a deviation segment selected by the user. In this aspect, additionally or alternatively, the navigation device may further comprise one or more location sensors from which the navigation device determines at least a travel path of the one or more location sensors, and the processor may be further configured to detect deviations of the travel path from a route selected by the user, and determine the deviation segment based on the detected deviations. In this aspect, additionally or alternatively, the processor may be further configured to generate at least two different routes from a starting location to an ending location, receive a user selection of one of the at least two different routes, and determine the deviation segment based on a route difference between the at least two different routes. In this aspect, additionally or alternatively, the processor may be further configured to receive intraroute feedback from the user of the navigation device during travel of a route including one or more route segments, and determine a preferred route characteristic of the user of the navigation device based on at least the received intraroute feedback and route characteristics of the one or more route segments of the route. In this aspect, additionally or alternatively, the processor may be further configured to detect that the navigation device has come to a stop, and display a graphical user interface element configured to receive the intraroute feedback during the stop. In this aspect, additionally or alternatively, the processor may be further configured to determine a preferred route characteristic of the user of the navigation device based on at least user input to the navigation device. In this aspect, additionally or alternatively, the processor may be further configured to determine a preferred route characteristic of the user of the navigation device based on at least one or more applications installed on the navigation device. In this aspect, additionally or alternatively, the processor may be further configured to retrieve peer user route preferences for a peer user of a peer navigation device, the peer user route preferences indicating one or more preferred route characteristics of the peer user, and generate the personalized route to further include at least one route segment having route segment data indicating at least one of the one or more preferred route characteristics of the peer user. In this aspect, additionally or alternatively, the processor may be further configured to detect that the peer user of the peer navigation device is traveling with the user of the navigation device. In this aspect, additionally or alternatively, the user route preferences may further include context data for each of the one or more preferred route characteristics. In this aspect, additionally or alternatively, the context data may be selected from the group consisting of a time of day, a day of year, and a weather condition. In this aspect, additionally or alternatively, the processor may be further configured to generate a plurality of alternative routes from the starting location to the ending location, determine which route among the plurality of alternative routes includes route segments having a highest match with the one or more preferred route characteristics of the user, and display that route with an indication that the route matches the preferred route characteristics for the user.

Another aspect provides a method comprising, at a processor of a computing device, retrieving user route preferences for a user of the computing device, the user route preferences indicating one or more preferred route characteristics, receiving a request for a route from a starting location to an ending location via an input device of the computing device, reading stored map information including a plurality of route segments, each route segment including route segment data indicating one or more route characteristics of that route segment, generating a personalized route that includes at least one route segment having route segment data indicating at least one of the one or more preferred route characteristics of the user, and displaying the personalized route to the user. In this aspect, additionally or alternatively, the method may further comprise determining a preferred route characteristic of the user of the computing device based on at least a route characteristic of a deviation segment selected by the user. In this aspect, additionally or alternatively, the method may further comprise determining a travel path of a location sensor of the computing device, detecting deviations of the travel path from a route selected by the user, and determining the deviation segment based on the detected deviations. In this aspect, additionally or alternatively, the method may further comprise generating at least two different routes from a starting location to an ending location, receiving a user selection of one of the at least two different routes, and determining the deviation segment based on a route difference between the at least two different routes. In this aspect, additionally or alternatively, the method may further comprise receiving intraroute feedback from the user of the computing device during travel of a route including one or more route segments, and determining a preferred route characteristic of the user of the computing device based on at least the received intraroute feedback and route characteristics of the one or more route segments of the route.

Another aspect provides a navigation device, comprising one or more input devices configured to receive starting and ending locations for route navigation, and a processor configured to retrieve user route preferences for a user of the navigation device, the user route preferences indicating one or more preferred route characteristics, receive a request for a route from a starting location to an ending location via the one or more input devices, read stored map information including a plurality of route segments, each route segment including route segment data indicating one or more route characteristics of that route segment, generate a plurality of alternative routes from the starting location to the ending location, determine which route among the plurality of alternative routes includes route segments having a highest match with the one or more preferred route characteristic of the user, and display that route with an indication that the route matches the preferred route characteristics for the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A navigation device, comprising:
one or more input devices configured to receive starting and ending locations for route navigation; and
a processor configured to:
during travel of a prior route including one or more prior-route segments for a utilized mode of transportation, detect a stop of the navigation device along the prior route;
based on detecting the stop, display a graphical user interface element configured to receive intraroute feedback;
receive the intraroute feedback via the graphical user interface element;
determine a preferred route characteristic of a user for the utilized mode of transportation based on at least the intraroute feedback and prior-route characteristics of the one or more prior-route segments;
store the determined preferred route characteristic of the user for the utilized mode of transportation;
receive a request for a route from a starting location to an ending location via the one or more input devices;
retrieve user route preferences for the user, the user route preferences indicating one or more preferred route characteristics for each of a plurality of modes of transportation, including the determined preferred route characteristic for the utilized mode of transportation on the prior route;
determine a mode of transportation for the user for the route, wherein the determined mode of transportation is the utilized mode of transportation on the prior route;
read stored map information including a plurality of route segments for the determined mode of transportation, each route segment including route segment data indicating one or more route characteristics of that route segment;
generate a personalized route that includes at least one route segment for the determined mode of transportation having route segment data indicating at least the preferred route characteristic for the determined mode of transportation; and
display the personalized route to the user.

2. The navigation device of claim 1, wherein the user route preferences indicate at least one preferred route characteristic for a first mode of transportation that is different than at least one preferred route characteristic for a second mode of transportation.

3. The navigation device of claim 1, wherein the plurality of modes of transportation are selected from the group consisting of driving, biking, walking, and public transit.

4. The navigation device of claim 1, wherein the one or more preferred route characteristics are selected from the group consisting of a scenic route characteristic, an energy saving route characteristic, a cost saving route characteristic, an easy navigation difficulty route characteristic, a hard navigation difficulty route characteristic, a route visibility characteristic, a route convenience characteristic, and a route safety characteristic.

5. The navigation device of claim 1, wherein the processor is further configured to determine a preferred route characteristic of the user of the navigation device for at least one of the plurality of modes of transportation based on at least a route characteristic of a deviation segment selected by the user.

6. The navigation device of claim 5, further comprising one or more location sensors from which the navigation device determines at least a travel path of the one or more location sensors, and wherein
the processor is further configured to:
generate a plurality of routes from the starting location to the ending location, wherein the plurality of routes includes the personalized route;
receive a user selection of the travel path;
detect deviations of the travel path from a route selected by the user; and determine the deviation segment based on the detected deviations.

7. The navigation device of claim 5, wherein the processor is further configured to:
generate a plurality of routes from the starting location to the ending location, wherein the plurality of routes includes the personalized route;
receive a user selection of one of the plurality of routes; and
determine the deviation segment based on a route difference between the plurality of routes.

8. The navigation device of claim 1, wherein the user route preferences further include context data for each of the one or more preferred route characteristics.

9. The navigation device of claim 8, wherein the context data is selected from the group consisting of a time of day, a day of year, and a weather condition.

10. The navigation device of claim 1, wherein the processor is further configured to:
generate a plurality of alternative routes from the starting location to the ending location, wherein the plurality of alternative routes includes the personalized route;
determine which route among the plurality of alternative routes includes route segments having a highest match with the one or more preferred route characteristics of the user; and
display that route with an indication that the route matches the preferred route characteristics for the user.

11. A method comprising:
at a processor of a computing device:
during travel of a prior route including one or more prior-route segments for a utilized mode of transportation, detecting a stop of a navigation device along the prior route;
based on detecting the stop, displaying a graphical user interface element configured to receive intraroute feedback;
receiving the intraroute feedback via the graphical user interface element; and
determining a preferred route characteristic of a user for the utilized mode of transportation based on at least the intraroute feedback and prior-route characteristics of the one or more prior-route segments;
storing the determined preferred route characteristic of the user for the utilized mode of transportation;
receiving a request for a route from a starting location to an ending location via one or more input devices;
retrieving user route preferences for the user, the user route preferences indicating one or more preferred route characteristics for each of a plurality of modes of transportation, including the determined preferred route characteristic for the utilized mode of transportation on the prior route;
determining a mode of transportation for the user for the route, wherein the determined mode of transportation is the utilized mode of transportation on the prior route;
reading stored map information including a plurality of route segments for the determined mode of transportation, each route segment including route segment data indicating one or more route characteristics of that route segment;
generating a personalized route that includes at least one route segment for the determined mode of transportation having route segment data indicating at least the preferred route characteristic for the determined mode of transportation; and
displaying the personalized route to the user.

12. The method of claim 11, wherein the user route preferences indicate at least one preferred route characteristic for a first mode of transportation that is different than at least one preferred route characteristic for a second mode of transportation.

13. The method of claim 11, wherein the plurality of modes of transportation are selected from the group consisting of driving, biking, walking, and public transit.

14. The method of claim 11, further comprising determining the preferred route characteristic of the user of the computing device for at least one of the plurality of modes of transportation based on at least a route characteristic of a deviation segment selected by the user.

15. The method of claim 14, further comprising:
determining a travel path of a location sensor of the computing device;
generating a plurality of routes from the starting location to the ending location, wherein the plurality of routes includes the personalized route;
receiving a user selection of the travel path;
detecting deviations of the travel path from a route selected by the user; and
determining the deviation segment based on the detected deviations.

16. The method of claim 14, further comprising:
generating a plurality of routes from the starting location to the ending location, wherein the plurality of routes includes the personalized route;
receiving a user selection of one of the plurality of routes; and
determining the deviation segment based on a route difference between the plurality of routes.

17. A navigation device, comprising:
one or more input devices configured to receive starting and ending locations for route navigation;
a processor configured to:
during travel of a prior route including one or more prior-route segments for a utilized mode of transportation, detect a stop of the navigation device along the prior route;
based on detecting the stop, display a graphical user interface element configured to receive intraroute feedback;
receive the intraroute feedback via the graphical user interface element;
determine a preferred route characteristic of a user for the utilized mode of transportation based on at least the intraroute feedback and prior-route characteristics of the one or more prior-route segments;
store the determined preferred route characteristic of the user for the utilized mode of transportation;
receive a request for a route from a starting location to an ending location via the one or more input devices;
retrieve user route preferences for the user, the user route preferences indicating one or more preferred route characteristics for each of a plurality of modes of transportation, including the determined preferred route characteristic for the utilized mode of transportation on the prior route;
determine a mode of transportation for the user for the route, wherein the determined mode of transportation is the utilized mode of transportation on the prior route;
read stored map information including a plurality of route segments for the determined mode of transportation, each route segment including route segment data indicating one or more route characteristics of that route segment;

generate a plurality of alternative routes from the starting location to the ending location for the determined mode of transportation;

determine which route among the plurality of alternative routes includes route segments having a highest match with the preferred route characteristic for the determined mode of transportation; and display that route with an indication that the route matches the preferred route characteristic.

\* \* \* \* \*